United States Patent
Mahy

[19]

[11] Patent Number: 5,832,109
[45] Date of Patent: Nov. 3, 1998

[54] METHOD AND APPARATUS FOR CALCULATING COLOR GAMUTS

[75] Inventor: Marc Mahy, Wilsele, Belgium

[73] Assignee: Agfa Gevaert N.V., Belgium

[21] Appl. No.: 706,854

[22] Filed: Sep. 3, 1996

[30] Foreign Application Priority Data

Sep. 15, 1995 [EP] European Pat. Off. ............ 95202501

[51] Int. Cl.⁶ .................... G06K 9/00; G03F 3/08; H04N 1/46
[52] U.S. Cl. .................... 382/162; 355/518; 355/530
[58] Field of Search .................... 382/162, 166, 382/167; 358/518, 520, 523, 530

[56] References Cited

U.S. PATENT DOCUMENTS

| | | | |
|---|---|---|---|
| 5,268,754 | 12/1993 | Vande Capelle | 358/527 |
| 5,416,890 | 5/1995 | Beretta | 395/131 |
| 5,563,724 | 10/1996 | Boll et al. | 358/502 |
| 5,581,376 | 12/1996 | Harrington | 358/518 |
| 5,583,666 | 12/1996 | Ellson | 358/518 |
| 5,604,610 | 2/1997 | Spaulding et al. | 358/525 |
| 5,611,030 | 3/1997 | Stokes | 395/131 |

OTHER PUBLICATIONS

Neugebauer Memorial Seminar on Color Reproduction; David Spooner; Dec. 1989 pp. 131–136.

*Primary Examiner*—Thomas D. Lee
*Assistant Examiner*—Jerome Grant, II
*Attorney, Agent, or Firm*—Robert A. Sabourin

[57] ABSTRACT

A method and an apparatus are disclosed to obtain a color gamut description of a multidimensional color reproduction device. The method is based on dividing the domain of the device into a number of subdomains that are selected such that the union of the color gamuts of the corresponding subdomains equals the color gamut of the multidimensional color reproduction device.

25 Claims, 18 Drawing Sheets

KCMY:K=1.0

KCMY:C=1.0

KCMY:K=0.0

KCMY:Y=1.0

KCMY:Y=0.0

KCMY:M=1.0

KCMY:M=0.0

METHOD AND APPARATUS FOR CALCULATING COLOR GAMUTS

FIELD OF THE INVENTION

The present invention relates to devices and methods for image rendering by means of multidimensional color reproduction devices.

BACKGROUND OF THE INVENTION

The independent values with which the color device can be addressed are called colorants or inks. For purposes of generality, the physically achievable values for these colorants range from 0 to 100%. A color reproduction device with n colorants will be called a printer or an n-ink process.

A typical device we have in mind is a multidimensional color printer with n colorants such as a cmyk offset printing press, but the invention can also be applied to other devices such as color displays, color photography or slide makers.

With colorant space is meant an n-dimensional space with n the number of independent variables with which the printer can be addressed. In the case of an offset printing press the dimension of the space corresponds to the number of inks of the printer.

With color space is meant a space that represents a number of quantities of an object that characterize its color. In most practical situations, colors will be represented in a 3-dimensional space such as the CIE XYZ space. However, other characteristics also can be used such as multispectral values based on filters that are not necessarily based on a linear transformation of the color matching functions to represent color. A typical example is an n-dimensional space of which the axes correspond to densities.

With colorant gamut or colorant domain is meant the delimited space in colorant space of colorant combinations that are physically realizable by a given printer, taking into account possible extra limitations on colorant combinations. In this invention it is supposed that colorant limitations can always be specified by mathematical formulas that describe the boundaries of the desired colorant gamut.

The colorant gamut of a cmyk offset press for example is delimited by a linear condition that limits the sum of the four colorants (for example to 340%).

A printer model is a mathematical relation that expresses color values in function of colorants for a given printer. The variables for the colorants are denoted as $c_1, c_2, \ldots, c_n$ with n the dimension of the colorant space.

An n-ink process is completely characterized by its colorant gamut with a number of colorant limitations and the printer model. Because of this close relationship between an n-ink process and the printer model, the operations typical for a printer model are also defined for the n-ink process. With inverting an n-ink process is meant that the corresponding printer model is inverted. The transformation of an n-ink process to color space on the other hand is equivalent to the transformation of the corresponding colorant domain to color space by making use of the printer model.

If an n-ink process is given with colorant limitations in the colorant domain and if an m-ink process is deduced from this n-ink process by setting n-m colorants to constant values in the printer model of the n-ink process, the colorant limitations are inherited by this m-ink process if the colorant gamut of the m-ink process is restricted by colorant limitations obtained by setting the n-m colorants in the colorant limitations of the colorant gamut of the n-ink process to their constant values.

Extracting an m-ink process out of an n-ink process with m<n, means that n-m out of the n colorants in the printer model are replaced by a constant value. The colorants of such a m-ink process vary between the minimum and maximum values they can have according to the colorant gamut of the n-ink process and the colorant limitations are inherited by the m-ink process. The m-ink process is called the extracted m-ink process of the n-ink process.

If an m-ink process is extracted from an n-ink process, and the n-m out of the n colorants in the printer model of the n-ink process are replaced by their minimum or maximum value as defined by the colorant gamut of the n-ink process, the m-ink process is called a boundary m-ink process of the n-ink process.

In general there are $$\frac{n!}{(n-m)!m!} 2^{n-m}$$

boundary m-ink processes of an n-ink process. The colorants in the colorant gamut of a boundary m-ink process vary between the minimum and maximum values they can have according to the colorant gamut of the n-ink process and the colorant limitations are inherited by the m-ink process.

With color gamut is meant a delimited region in color space, containing colors that are physically realizable by a given printer, taking into account possible extra limitations on colorant combinations. A color gamut is completely determined by its boundaries. In a 3-dimensional color space these boundaries are surfaces, and hence there will be surfaces in colorant space that map to the color gamut boundaries. In general several kinds of colorant surfaces should be taken into account, but for well-behaved printers the color gamut is, by definition, exactly determined by the transformation of the colorant domains of some boundary 2-ink processes of the n-ink process to color space. It can be shown that this condition is equivalent with saying that in an n-ink process, a colorant combination lies inside the color gamut if there are at least three colorants that can be changed both positively as well as negatively without leaving the colorant gamut. Such surfaces in colorant space are called physical colorant boundaries that are transformed by the printer model to the physical color boundaries in color space. In the case of an s-dimensional color space, the dimension of the boundaries is s-1. Physical colorant boundaries correspond in this case to the domains of the boundary (s-1)-ink processes of the n-ink process. The physical color boundaries are obtained by transforming the domains of the boundary (s-1)-ink processes of the n-ink process to color space. In this invention it is assumed that the color gamut is completely determined by the physical boundaries.

The color gamut of a printer is certainly one of its most important characteristics. An explicit representation of this gamut is highly desirable, for example, to enable the optimal reproduction of images that contain colors that fall outside the color gamut of the printer.

Because our invention is based on the use of a printer model, a few more words of explanation are given on the subject of printer models.

The Neugebauer Equations

Different mathematical expressions have been proposed to model printing processes, along which the Neugebauer equations are certainly the most known ones.

The Neugebauer equations reflect how color originates in halftone printing. The printing with three inks $c_1$ $c_2$ and $c_3$ by means of three halftone screens results theoretically in eight possible combinations of colorant overlap, called the Neugebauer primaries. If the size of the halftone dots is small enough not to be resolvable by the eye, the resulting color is a weighted sum of the tristimulus values of these primaries. For a 3-ink process, the Neugebauer equation for the X tristimulus value is given by $$X_{(c_1, c_2, c_3)} = a_w X_w + a_1 X_1 + a_2 X_2 + a_3 X_3 + a_{12} X_{12} + a_{13} X_{13} + a_{23} X_{23} + a_{123} X_{123}$$

If it is assumed that the relative positions of the halftone dots are random, the Neugebauer equations can be calculated from the Demichel equations that predict the fraction of each combination of the three inks as a function of their respective dot percentages $c_1$, $c_2$ and $c_3$, and this leads to the Neugebauer equations in their most often encountered form:

$$a_w = (1-c_1)(1-c_2)(1-c_3)$$

$$a_1 = (c_1)(1-c_2)(1-c_3)$$

$$a_2 = (1-c_1)(c_2)(1-c_3)$$

$$a_3 = (1-c_1)(1-c_2)(c_3)$$

$$a_{23} = (1-c_1)(c_2)(c_3)$$

$$a_{13} = (c_1)(1-c_2)(c_3)$$

$$a_{12} = (c_1)(c_2)(1-c_3)$$

$$a_{123} = (c_1)(c_2)(c_3)$$

in which $c_1$, $c_2$ and $c_3$ represent the dot percentages of the three inks.

The equations for the Y and Z values are obtained by replacing the X values by the corresponding Y and Z values respectively. The extension of the Neugebauer equations for n inks is straightforward. According to one interpretation, the Neugebauer equations predict the X, Y and Z tristimulus values by means of trilinear interpolation from the corresponding tristimulus values of the 8 Neugebauer "primaries". If the Neugebauer equations are used as multilinear interpolation formulae, they can be used to model any color device in any color space.

Working out the Demichel coefficients in the Neugebauer equations and rearranging the terms gives the following set of polynomial expressions:

$$X = k_0 + k_1 c_1 + k_2 c_2 + k_3 c_3 + k_{12} c_1 c_2 + k_{13} c_1 c_3 + k_{23} c_2 c_3 + k_{123} c_1 c_2 c_3$$

$$Y = l_0 + l_1 c_1 + l_2 c_2 + l_3 c_3 + l_{12} c_1 c_2 + l_{13} c_1 c_3 + l_{23} c_2 c_3 + l_{123} c_1 c_2 c_3$$

$$Y = m_0 + m_1 c_1 + m_2 c_2 + m_3 c_3 + m_{12} c_1 c_2 + m_{13} c_1 c_3 + m_{23} c_2 c_3 + m_{123} c_1 c_2 c_3$$

This leads to an interpretation of the Neugebauer equations as a set of "interpolating polynomials". The coefficients can be calculated from the X, Y and Z values of the eight Neugebauer primaries, or they can be obtained by means of a regression technique on a large set of color-colorant combinations.

Improving the Precision of the Neugebauer Printing Model

Real printing processes seldom behave exactly according to the physical model on which the Neugebauer equations are based and this explains the deviations that can occur between the predicted and measured color for a given colorant combination. Various modifications of the Neugebauer equations have therefore been suggested to improve their precision, among which the n-modified and the spectral Neugebauer equations are only cited. The interpretation of the Neugebauer equations as interpolating polynomials leads to the introduction of additional higher order terms, while their interpretation as trilinear interpolation suggests the concept of "piece wise trilinear interpolation" to improve the accuracy of the model. The different subdomains are called the Neugebauer cells. The latter method is known under the name of cellular or localized Neugebauer equations (LNE). More information on these models is found in the article by Rollestone Robert and Balasubramanian Raja (1993), "Accuracy of Various Types of Neugebauer Model", 1993 IS&T and SID's Color Imaging Conference: Transforms & Transportability of Color, pp. 32–37.

Calculation of the Color Gamut Boundaries.

An example of a first heuristic method is described in "Derivation of 3-dimensional gamut descriptions for graphic arts output devices", presented at TAGA 94 by William Kress and Michael Stevens. According to this method, the colorant gamut is sampled and the resulting colorant combinations are evaluated by means of a printer model. The resulting colors are then classified in "bins" of, for example, different CIE lightness values. The envelope of the colors that lie within one such a "bin" reflects an approximation of the shape of the color gamut at the corresponding constant lightness value. The method is conceptually simple, but has a number of drawbacks. In the first place a large set of samples in the colorant gamut is needed to achieve a reasonable description of the color gamut boundaries. Hence this method is quite slow and the processing time for this method increases exponentially with the number of colorants. A second problem is that from a mathematical point of view it is difficult to determine the exact boundaries of the color gamut per lightness level from a set of discrete points. Particularly the detection of holes or several contours per lightness level is rather complicated, if not impossible. Moreover, the method is not always robust because it may fail to detect the exact contours if the sampling distance in the colorant space is too large so that neighboring points in colorant space are transformed to colors in color space that are not seen as connected by the color gamut boundary detection method.

According to a second approach, the color gamut boundaries are "explored" in one of the color spaces using heuristic techniques. A "start color" is first selected that is known to fall inside the reproducible color gamut. This color is then incrementally changed keeping two of the three dimensions (for example hue and lightness) constant. The changed color is then separated and the colorant values are evaluated. If they fall within the colorant gamut, the corresponding color is assumed to fall within the printable color gamut and a next increment is added to the color. If, however, the set of colorant values falls outside the colorant gamut, a point of the colorant gamut boundary is assumed to lie in between the current and the previous separated color. By returning to the last color that still was within the color gamut and making the color increment smaller, the exact position of the point of the color gamut boundary can be determined with any desired precision. By selecting a sufficient number of "start colors" and a sufficient number of directions for the color change, the boundaries of the color gamut can be reasonably estimated. This method, however, also has a number of drawbacks. The method mainly works in color space, so the printer model has to be inverted. Until now this has almost always been done by making use of iterative methods. If several colorant combinations give rise to the same color, only one solution will be found. If that solution lies outside the colorant gamut, wrong conclusions will be drawn for the color gamut if at least one of the other solutions would be inside the colorant domain. As a result the method is not always robust. A second problem is that the method is not correct when the color gamut is concave or when per cross section several contours have to be determined. A third drawback is that the heuristic nature of the procedure leads to very long calculations since many more points need to be evaluated than are obtained for the description of the color gamut boundary itself. A faster version of this method is represented in the article "The color gamut obtainable by the combination of subtractive color dyes", Journal of Imaging Science, Vol. 30, No. 1, 1986 by N. Otha. Per lightness plane a border point is searched for and the next border point is detected by looking radially around this point. From this new border point the next border point is detected again by radially looking around it. This last procedure is repeated until the first border point is reached again. In this way concave contours can be detected, but nevertheless this iterative method is still quite slow, the printer model has to be inverted and multiple contours are not detected.

A third approach is described in the article by Masao Inui, "Fast Algorithm for Computing Color Gamuts", Color Research and Application, Vol. 18, No. 5, October 1993. In order to calculate a color gamut descriptor of a 3-ink process, the following procedure is performed:

Step 1: The lightness values at the eight vertices of the dye delimited solid are calculated for zero and maximum amounts;

Step 2: For a given lightness, the locations of several equilightness points on the edges of the dye delimited solid are computed;

Step 3: Loci connecting these points on the faces of the dye delimited solid are computed;

Step 4: The loci are mapped into color space to produce the boundary of the color gamut.

According to the article, the loci of the equilightness points on the faces of the dye solid are computed as follows. Since at the face of the color solid one of the colorants is equal to its minimum or maximum value, there are effectively only two colorants available as variables to achieve the desired lightness value. One of these variables can be used as a parameter, leaving only one value left to iterate on. One dimensional Newton-Raphson is used to determine the value of this remaining variable that results in the desired lightness value.

The above method is claimed to work very fast, but its weak point is that it relies on Newton Raphson iteration. Depending on the printer model, there may be several possible solutions, but only one solution will be found with iterative methods. Nevertheless, if several start points would be used to find all the solutions, the method becomes slow. Moreover, if indeed multiple solutions are found, it is not always possible to know which colorant combination belongs to (which one of) the previous solution(s), i.e. no information is available about the connectivity between different solutions.

In many situations, it is not desirable to print all the colorant combinations. A typical example is a cmyk offset printing process, for which the sum of the colorant values is limited to 340%. For some other colorant combinations, there may also be some printing problems if for example three times 100% is printed on top of each other, although the total amount of colorant may be larger than 300%. To avoid such effects, several colorant limitations may be given in the colorant domain.

To determine the color gamut of a printer with a number of colorant limitations, previous methods should be adapted. Some of them can be easily extended such as the first method, but all the previously cited problems remain. However, for the last method, the iteration becomes more complex, even in the case of simple mathematical printer models there will be multiple solutions which are difficult to find in a fast way. Moreover, if all the different solutions could be found, also in this case it is not always possible to connect the different solutions to form one or several contours.

The extension of the previous methods to more than three colorants is not always straightforward. Most methods suppose that there is a one to one relation between printers with three colorants and the color values. For printers with more than three colorants this is certainly no longer the case.

OBJECTS OF THE INVENTION

It should be clear from the above explanation that heuristic and iterative color gamut calculation should be avoided. A color gamut calculation method is needed that is fast, robust and exact, and that can be used with any number of colorant limitations for any number of colorants. Solutions to these problems are given by this invention if a printer model is available.

It is an object of the invention to represent a color gamut by its boundaries.

It is an object of the invention to specify the color gamut boundaries by a number of analytical functions.

It is an object of the invention to represent a color gamut as cross sections with a number of well chosen subspaces in color space.

It is an object of the invention to represent color gamut boundaries in a 3-dimensional color space as a number of contours, obtained by intersecting the color gamut with surfaces.

It is an object of the invention to obtain the color gamut of a printer that is modeled by different formulas in different subdomains by the union of a well chosen number of color subgamuts.

It is an object of the invention to obtain the color gamut of an m-ink process in an n-dimensional color space with m>n by the union of the color gamuts of all the boundary n-ink processes of the m-ink process.

It is an object of the invention that in a 3-dimensional color space an exact and robust color gamut descriptor with contours is obtained by applying a contour follower in all the physical colorant boundaries and connecting these partial contours properly.

It is an object of the invention that if a number of colorant limitations are given in the colorant space, an exact and robust color gamut descriptor with contours is obtained in a 3-dimensional color space by applying a kind of contour follower in 2-ink models and connecting these partial contours properly.

It is an object of the invention that an analytical color gamut descriptor can be constructed if the printer is modeled with the Neugebauer equations.

It is an object of the invention that an analytical color gamut descriptor can be constructed if the printer is modeled with the Neugebauer equations, even if the colorant domain is restricted by a number of colorant limitations.

It is an object of the invention that an analytical color gamut descriptor can be constructed if the printer is modeled with the localized Neugebauer equations.

It is an object of the invention that an analytical color gamut descriptor can be constructed if the printer is modeled with the localized Neugebauer equations and if the colorant domain is restricted by a number of colorant limitations. Further objects and advantages of the invention will become apparent from the description hereinafter.

SUMMARY OF THE INVENTION

The above mentioned objects are realized by the specific features according to claims 1, 10 or 17. Preferred embodiments of the invention are disclosed in the dependent claims.

The method according to the current invention is especially well suited for use in a three dimensional color space, also referred to as tristimulus color space. If colors are described in a four dimensional color space or a color space with an even higher dimension, the method according to the current invention is preferentially applied by reducing the number of dimensions to three. This may be accomplished by not using one or more dimensions, or by using the sum of two or more variables in color space, or any other function applied to such variables, such that finally three useful independent variables remain.

In a three dimensional color space, a color gamut is a solid. For describing this solid, the color gamut is preferentially intersected by a plurality of surfaces in color space. A surface is a set of points according to two degrees of freedom, and may be curved. A plane is a specific embodiment of a surface. A more accurate description of the color gamut may be obtained by intersecting it by more surfaces. For each surface, all points on the surface, which belong to the color gamut, are situated in one or more connected regions. Each such region is enclosed by a closed contour. A contour is a curve in color space, having one degree of freedom. In the most simple case, all points of the color gamut, situated on one surface, may be enclosed by just one closed contour. By specifying contours, each contour being situated in one surface, enclosing colors belonging to the color gamut of the reproduction device, the entire color gamut may be described. By knowing these contours, it may be easily decided whether a specific color belongs to the color gamut or not. Knowledge of this is important in color reproduction, in order to decide how colors outside the color gamut will be reproduced.

In a preferred embodiment, each surface is planar. In a specific embodiment, parallel planes in color space, each having a constant lightness may be used to intersect the color gamut. In that case, each closed contour is a planar closed curve, situated in a plane parallel to each other closed contour.

According to the current invention, a plurality of closed contours in color space may be constructed. We have found that it is more efficient to find curves in colorant space, corresponding to the closed contours in color space. Each curve is preferentially based on a sub-ink process, in which three inks or colorants are selected. Each curve is then transformed from colorant space to color space. Such a transformed curve gives a portion or segment of a closed contour in color space, or even the full closed contour. According to the method of the current invention, one or more contour segments may be concatenated. If "one" contour segment is "concatenated", this means that its starting point is connected with its endpoint, forming a closed contour. If two contour segments are concatenated, this means that the endpoint of the first contour segment is connected with the starting point of the second contour segment and the endpoint of the second contour segment is connected with the starting point of the first contour segment. Concatenation is preferentially done in colorant space, but it may equivalently be done in color space, after transforming the curve to color space.

In the broadest sense, Neugebauer cells are solids, as a portion from a colorant space, such that each point belonging to the colorant gamut belongs to at least one Neugebauer cell. Such Neugebauer cells may thus have common points, regions or solids. In a specific embodiment, the Neugebauer cells partition the colorant gamut in mutually disjunctive portions. This means that the intersection between each two Neugebauer cells is empty or comprises at most one surface. In a more preferred embodiment, each Neugebauer cell is a cuboid, i.e. a rectangular parallelepiped. A specific embodiment of a cuboid is a cube. The colorant gamut may be split cubes, all having the same size. In the broadest sense, "Neugebauer equations" as referred to in the current invention are equations having at least one non-linear term. A non-linear term is e.g. a quadratic term, cubic, etc. or a cross-product between two or more linear variables (e.g. $c_1 * c_2$) All sets of equations, all having constant or linear terms only, are excluded from the concept of "Neugebauer equations". Preferentially, Neugebauer equations are polynomials that express color values in terms of bilinear, trilinear or quadratic colorant values. In a specific embodiment, Neugebauer equations are limited to the formulae for X, Y and Z given under the title "The Neugebauer equations" in the background of the invention, which are referred to as trilinear equations.

By a 2-colorant space is meant the domain of a 2-ink process. In the previous paragraph only ink processes are treated with more than two colorants. In the case of a 2-ink process however, all the possible curves in the colorant space are determined twice. If these curves are concatenated, closed contours will be found that describe a segment of a curve in colorant space and after transformation by the printer model a segment of a contour in color space. In the case of a 1-ink process only one point is found and no concatenation is needed. Degenerated ink processes such as a 1-ink process resulting in for example the same luminance value are not considered.

For a specific surface, it is possible to find no closed contour. In that case there is no intersection of the surface with the color gamut. It is possible to find one closed contour. In that case, all color points on the corresponding surface, enclosed by the contour, belong to the color gamut. It is also possible to find two closed contours in one surface. In that case the intersection between the surface and the color gamut is given by the union of the color points on the surface enclosed by one or both contours. The same principles apply when more than two closed contours are found on one surface. Each sub-ink process may give a different closed contour on the surface.

In a preferred embodiment, all or a subset of all possible 3-ink processes from an N-ink process are processed one by one. Each individual 3-ink process results in zero, one or more closed contours in each surface, each closed contour being a concatenation of one or more contour segments. Once all 3-ink processes are processed, the union of all close contours found per surface is established, in order to find a color gamut description per surface. From the points enclosed by one or more contours, a new contour may be established, enclosing these "connected" points. From a 4-ink process, eight 3-ink processes may be extracted. According to the current invention, a subset of these eight 3-ink processes may be processed to establish the color gamut description.

A colorant boundary may be a minimum or maximum value for one colorant value, e.g. 0% or 100%. If the curve is based on a maximum or minimum colorant value, it is said to be derived from an extracted boundary ink process. A colorant limitation is a specific condition imposed on the combination of two or more colorants.

In this invention a fast, robust and exact color gamut description is presented. A color gamut is described by its boundaries. This can be done by either giving the functions describing these boundaries or by intersecting the color gamut with a number of surfaces in such a way that the intersections are a good representation of the color gamut related to the purpose of the color gamut description.

A color gamut of a printer can be obtained by the union of a well chosen number of color subgamuts. If for example the printer is modeled with different printer models in different colorant regions, the color gamut is the union of the color gamuts of these printer models. For printers with more than three colorants, the color gamut is obtained by the union of the color gamuts of all the boundary 3-ink processes from the given ink process.

In a 3-dimensional color space, the color gamut can be represented with a number of contours obtained by intersecting the color gamut with for example equiluminance planes. These contours are detected with a contour follower in a number of 2-ink colorant spaces. An equally exact and robust color gamut description is given if a number of colorant limitations are specified in colorant space.

If the printer is modeled with the Neugebauer equations, an analytical color gamut descriptor is given, even for several colorant limitations. This analytical color gamut descriptor is extended for the case of the localized Neugebauer equations and hence by approximating a printer model with the localized Neugebauer equations the color gamut can be obtained analytically for any printer model.

DETAILED DESCRIPTION OF THE INVENTION

Figure 1:
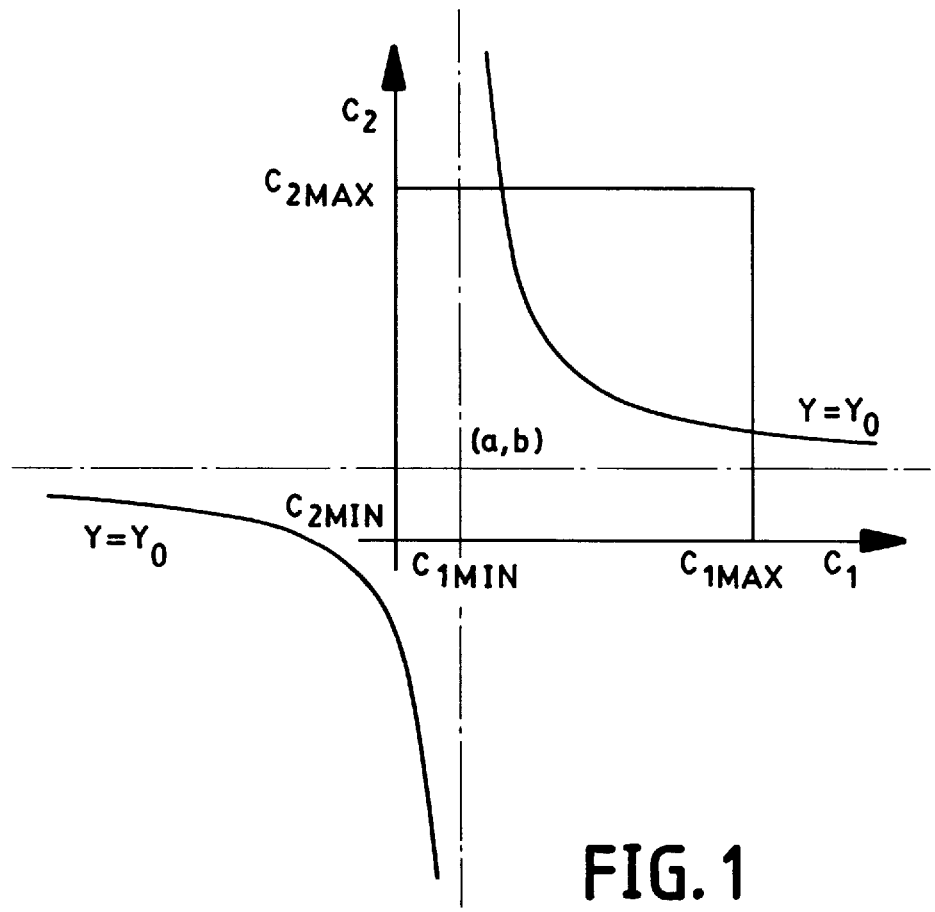
Figure 2A:
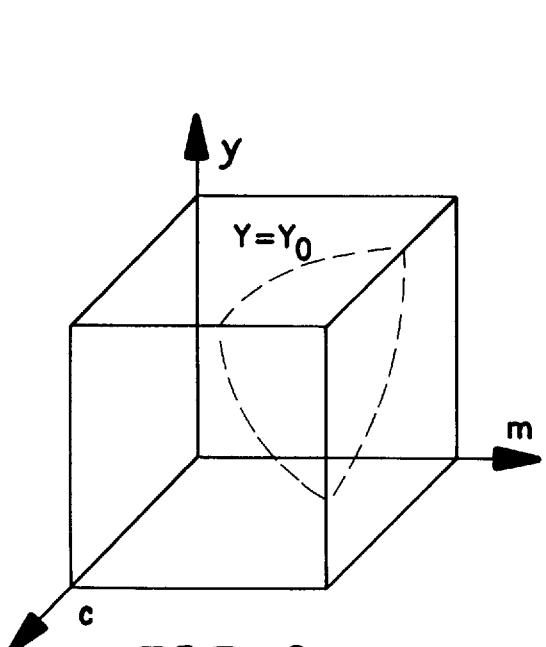
Figure 2B:
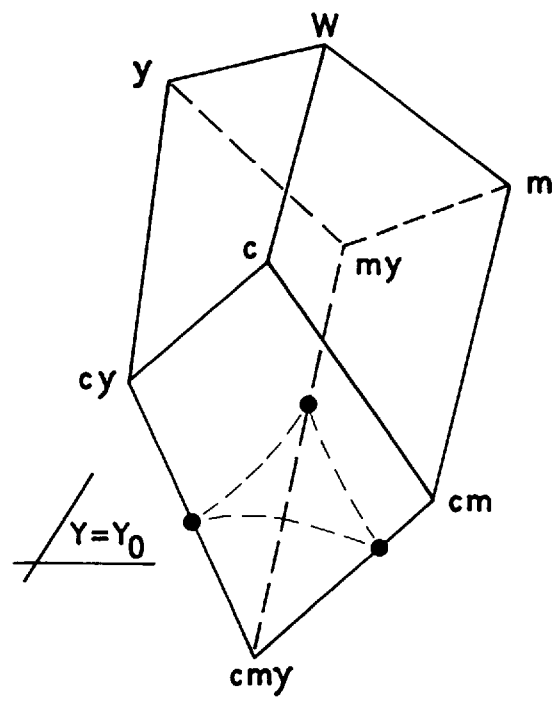
Figure 3:
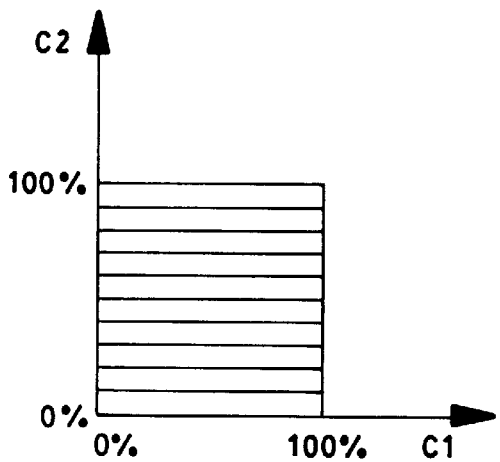
Figure 4:
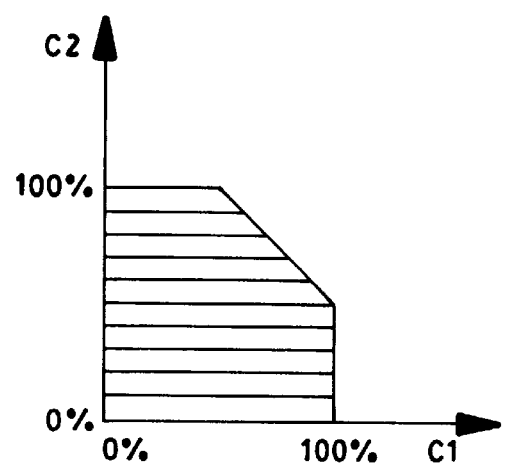
Figure 5:
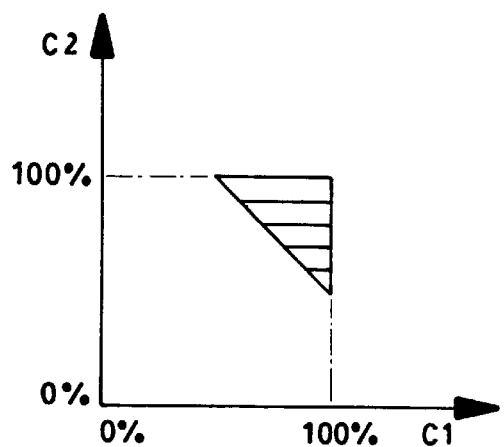

The invention is described hereinafter by way of examples with reference to the accompanying figure wherein:

FIG. 1 For a given color XYZ, each of the three Neugebauer equations corresponds to a hyperbola in the $c_1 c_2$ colorant plane. The asymptotes are horizontal and vertical lines and the point where both asymptotes intersect is the midpoint of the conic section. The drawing shows an example for the Neugebauer expression of Y=Y0;

FIG. 2A and 2B The twelve edges of the colorant cube are mapped onto straight lines in XYZ color space. The curved lines indicate intersections of the physical boundaries with surfaces of constant value Y=Y0;

FIG. 3 The colorant domain of the boundary 2-ink process with $c_3$=0% of a 3-ink process with a total colorant limitation of 250%;

FIG. 4 The colorant domain of the boundary 2-ink process with $c_3$=100% of a 3-ink process with a total colorant limitation of 250%;

FIG. 5 The colorant domain of the additional 2-ink process of a 3-ink process with a total colorant limitation of 250%.

Figure 6:
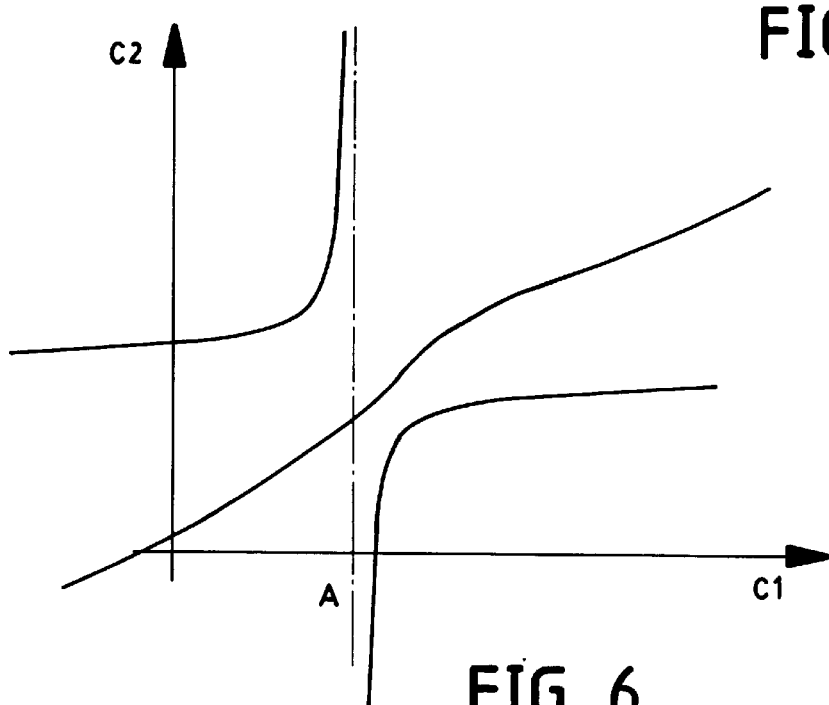
Figure 7:
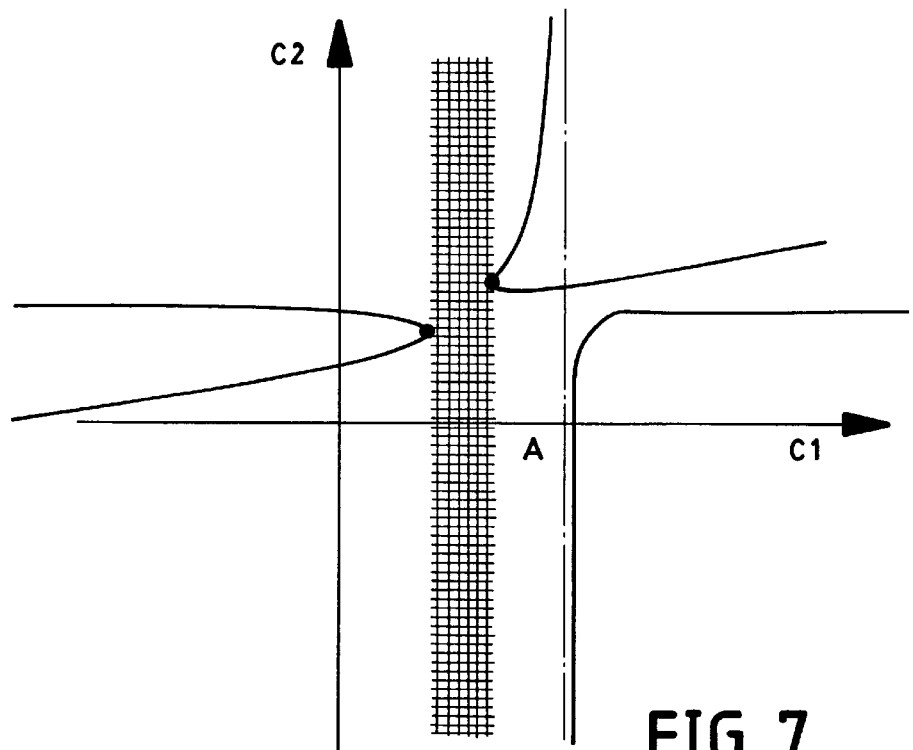
Figure 8:
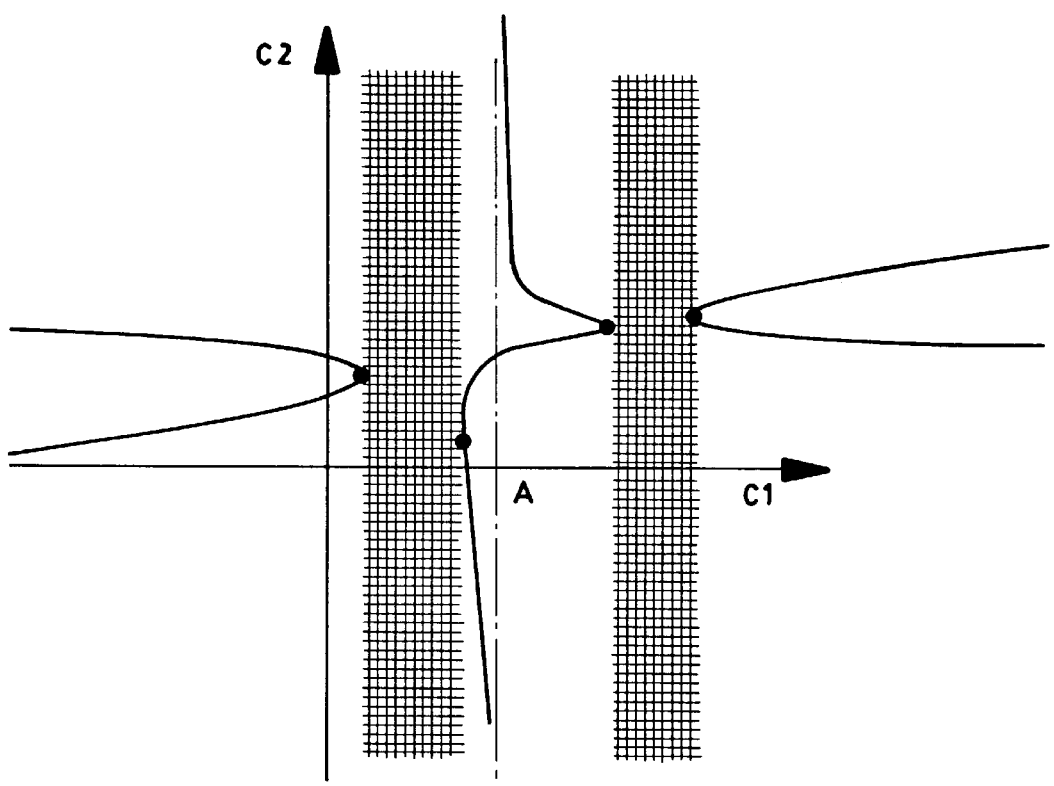
Figure 9:
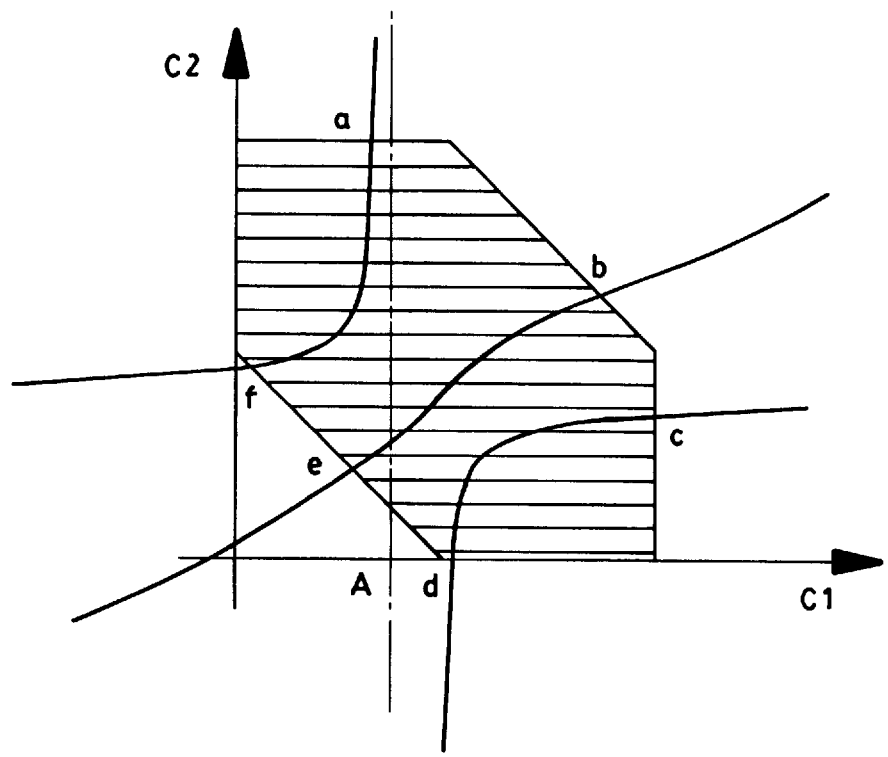
Figure 10A:
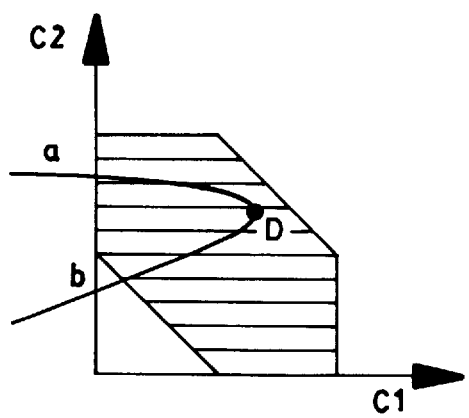
Figure 10B:
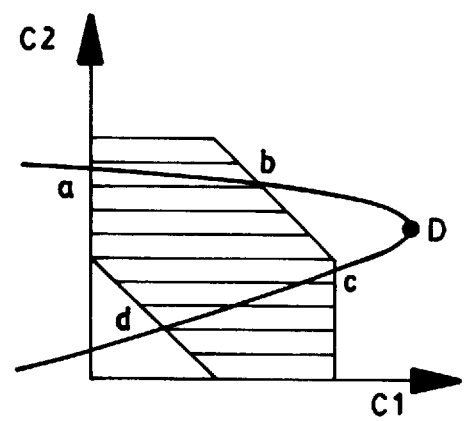

FIG. 6 The equiluminance curves in the colorant space of an additional 2-ink process with no real roots for the discriminant D. The point A corresponds to the root of the polynomial A=0;

FIG. 7 The equiluminance curves in the colorant space of an additional 2-ink process with two real roots for the discriminant D of which the position is indicated with black dots. The point A corresponds to the root of the polynomial A=0;

FIG. 8 The equiluminance curves in the colorant space of an additional 2-ink process with four real roots for the discriminant D. The point A corresponds to the root of the polynomial A=0;

FIG. 9 Class 1 corresponds to the equiluminance curves in the colorant space of an additional 2-ink process with no real roots for the discriminant D. The point A corresponds to the root of the polynomial A=0. The shaded area is the colorant domain of the additional 2-ink process. It is limited by a polygon that consists of 6 line segments. The intersections of the line segments with the equiluminance curves are indicated by the points a, b, c, d, e and f. The classification of these points results in pairs that are the end points of parts of the equiluminance curves that are inside the colorant domain;

FIG. 10A and 10B Class 2 corresponds to the behavior of a part of the equiluminance curves in the colorant space of an additional 2-ink process for the interval from −infinity (respectively +infinity) to the lowest (largest) root of the discriminant D and the root of the polynomial A lies outside this domain, The shaded area is the colorant domain of the additional 2-ink process. It is limited by a polygon that consists of 6 line segments. The point D, indicated by the black point, is a root of the discriminant D. In FIG. 10A the point D lies inside the colorant domain, and In FIG. 10A the point D is outside the colorant domain. The intersections of the line segments with the equiluminance curves are indicated by the points a and b for FIG. 10A and the points a, b, c and d for In FIG. 10A the point D is added twice as end point. The classification of these points results in pairs that are the end points of parts of the equiluminance curves that are inside the colorant domain.

Figures 11A, 11B:
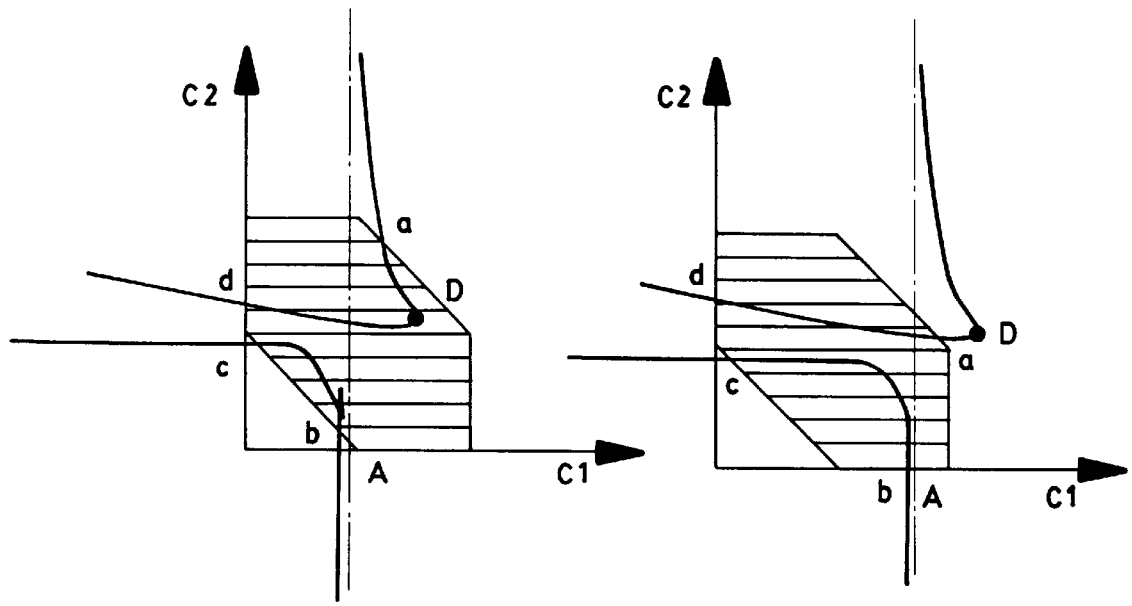
Figures 12C, 12D:
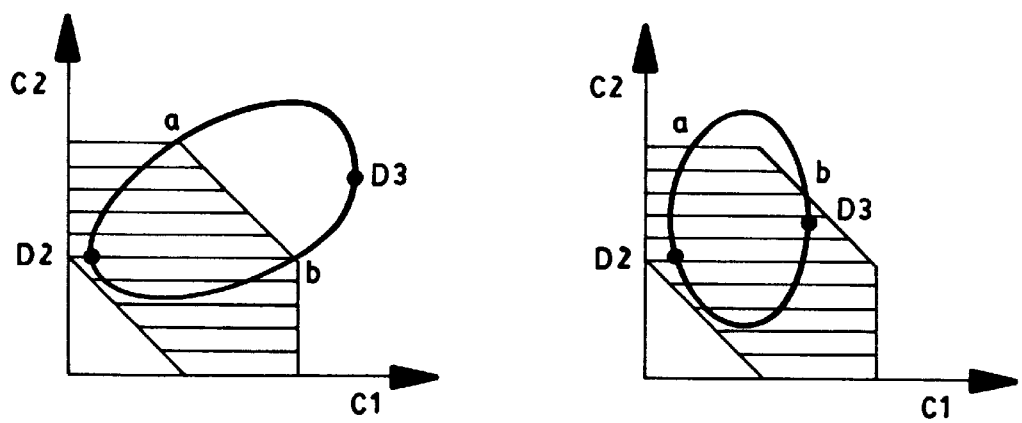
Figure 12A:
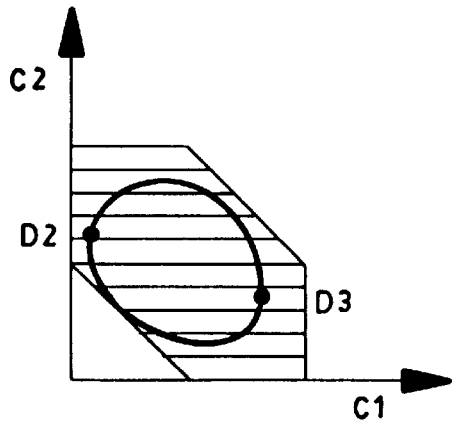
Figure 12B:
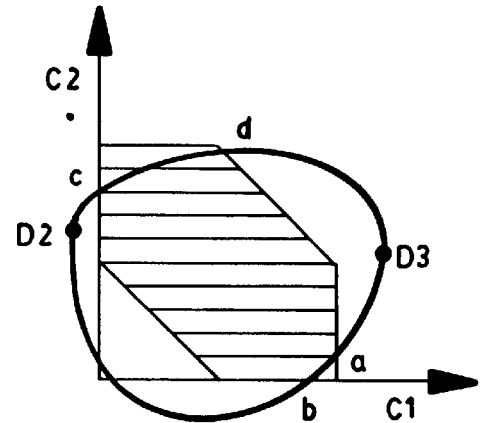

FIG. 11A and 11B Class 3 corresponds to the behavior of a part of the equiluminance curves in the colorant space of an additional 2-ink process for the interval from −infinity (respectively +infinity) to the lowest (largest) root of the discriminant D and the root of the polynomial A lies inside this domain. The point A corresponds to the root of the polynomial A=0. The shaded area is the colorant domain of the additional 2-ink process. It is limited by a polygon that consists of 6 line segments. The point D, indicated by the black point, is a root of the discriminant D. In FIG. 11A the point D lies inside the colorant domain, and in FIG. 11B, the point D is outside the colorant domain. The intersections of the line segments with the equiluminance curves are indicated in both FIGS. 11A and 11B by the points a, b, c and d. In FIG. 11A, the point D is added twice as end point. The classification of these points results in pairs that are the end points of parts of the equiluminance curves that are inside the colorant domain.

FIG. 12A, 12B, 12C and 12D Class 4 corresponds to the behavior of a part of the equiluminance curves in the colorant space of an additional 2-ink process for the interval defined by the second and third root of the discriminant D and the root of the polynomial A lies outside this domain. The shaded area is the colorant domain of the additional 2-ink process. It is limited by a polygon that consists of 6 line segments. The points D2 and D3, indicated by the black points, are the second and third roots of the discriminant D.

FIGS. 12A, 12B, 12C and 12D indicate different possibilities for the positions of the points D2 and D3, i.e. if they are inside or outside the colorant domain. The intersections of the line segments with the equiluminance curves are indicated in the examples by the points a, b, c and d. The classification of these points results in pairs that are the end points of parts of the equiluminance curves that are inside the colorant domain. In the bottom left example there is no intersection point, nevertheless by taking into account the points D2 and D3, also in this case the closed curve will be found.

Figure 13A:
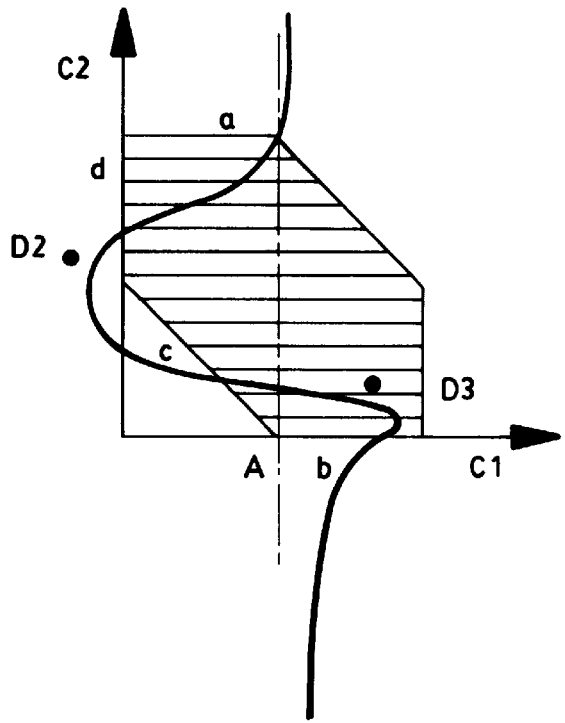
Figure 13B:
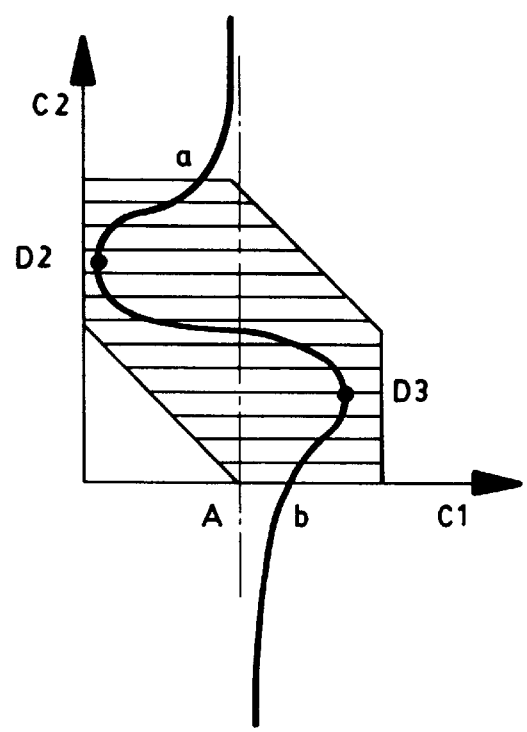

FIG. 13A and 13B Class 5 corresponds to the behavior of a part of the equiluminance curves in the colorant space of an additional 2-ink process for the interval defined by the second and third root of the discriminant D and the root of the polynomial A lies inside this domain. The point A corresponds to the root of the polynomial A=0. The shaded area is the colorant domain of the additional 2-ink process. It is limited by a polygon that consists of 6 line segments. The points D2 and D3, indicated by the black points, are the second and third root of the discriminant D. FIGS. 13A and 13B represent different possibilities for the positions of the points D2 and D3, i.e. if they are inside or outside the colorant domain. The intersections of the line segments with the equiluminance curves are indicated in the examples by the points a, b, c and d in the left example and a and b in the right example. The classification of these points results in pairs that are the end points of parts of the equiluminance curves that are inside the colorant domain.

Figure 14A:
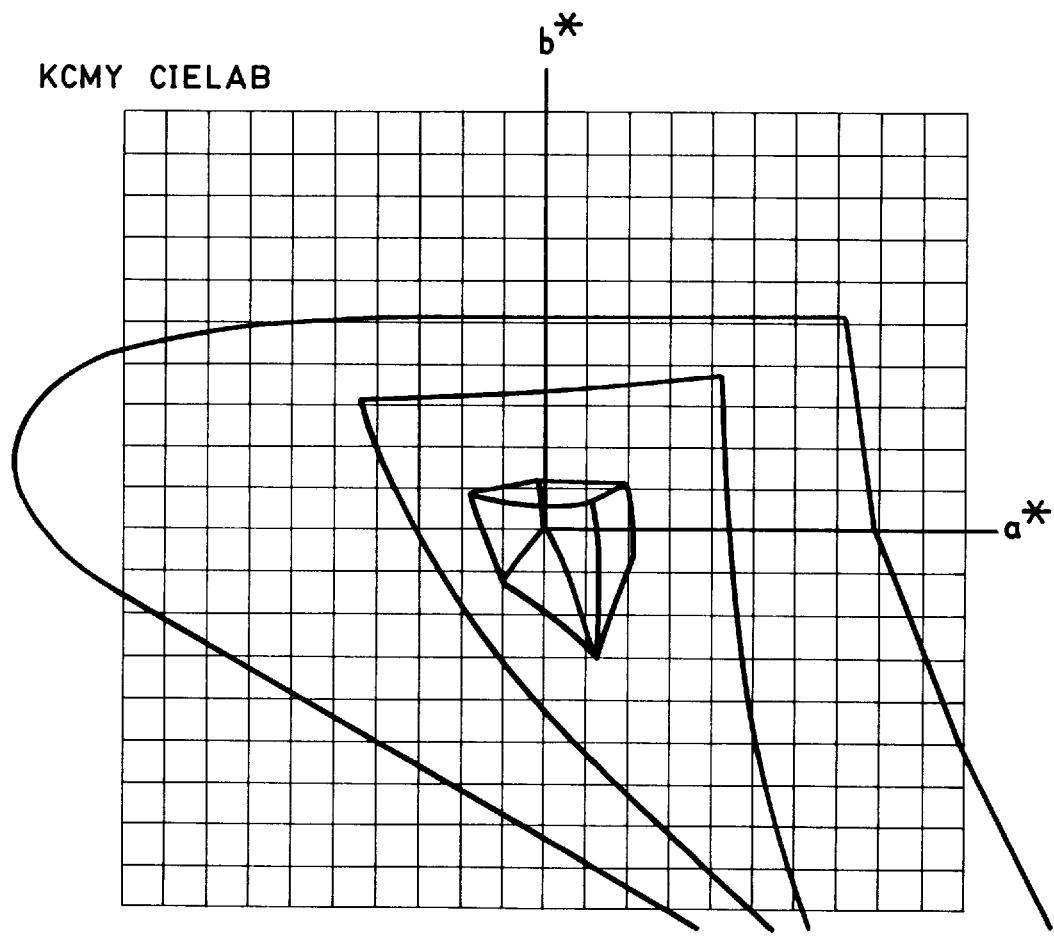

FIGS. 14A, 14B, 14C, 14D, 14E, 14F, 14G and 14H In FIG. 14A the cross section of the color gamut in CIELAB with the lightness plane L*=30 of a cmyk process modeled with the localized Neugebauer equations is represented. The horizontal (respectively vertical) axis corresponds with the a* (respectively b*) axis. The intersection of both axes is the achromatic color. The distance between the grid lines is 10 CIELAB units. The outer curve are the MacAdam limits, the thinner inner curve represents the color gamut of a color CRT display. The remaining curves are the cross sections of the physical color boundaries with the lightness plane L*=30. To calculate these contours, all the boundary 3-ink processes of the cmyk process are determined, and the intersection of their color gamut with the lightness plane L*=30 is calculated. The union of these cross sections corresponds to the cross section of the color gamut of the cmyk process with the given lightness plane. The intersections of the boundary 3-ink processes are represented in the FIGS. 14B and 14C. The constant colorant and its value is represented at the top of all these figures. The value 0.00 corresponds to 0% and the value 1.00 with 100%.

Figure 15A:
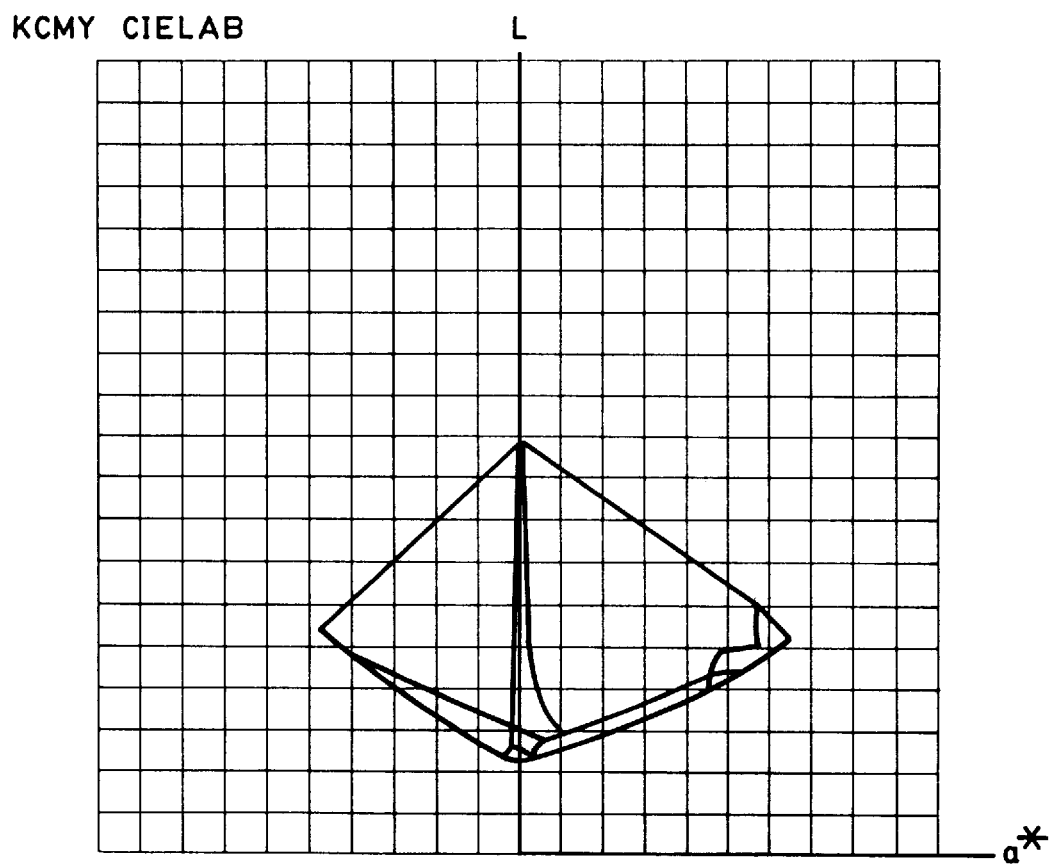
Figure 15C:
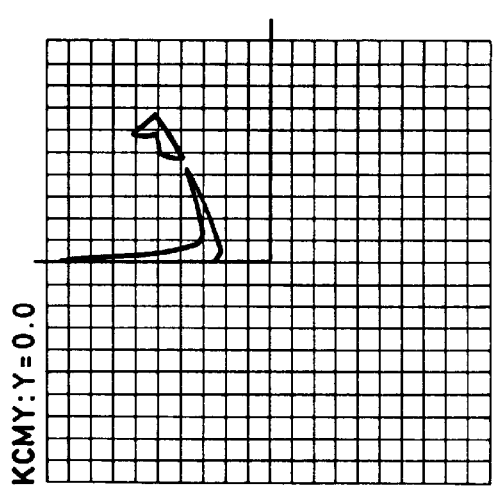
Figure 15E:
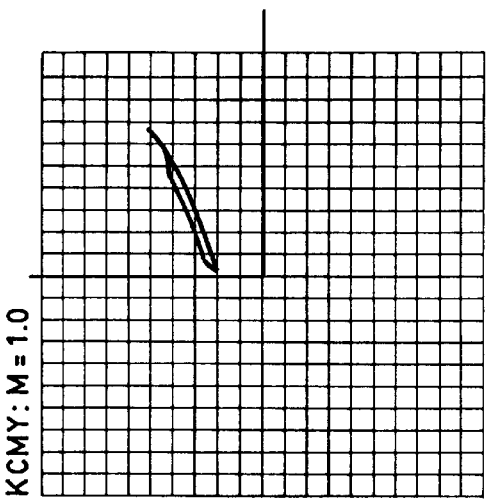
Figure 15B:
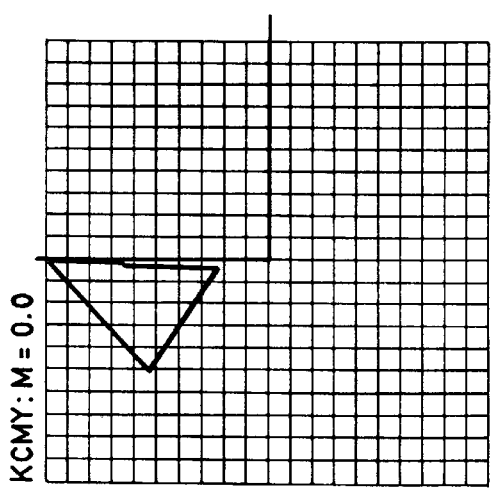
Figure 15D:
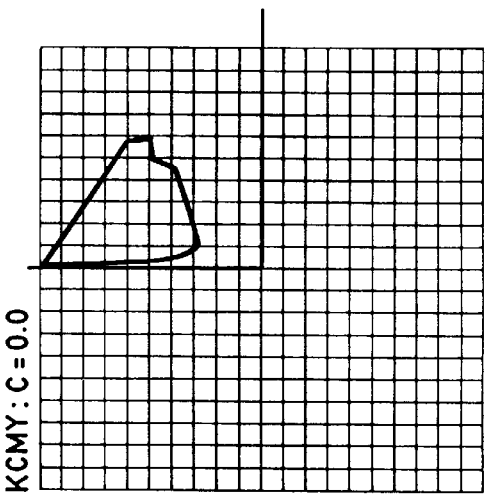
Figure 15H:
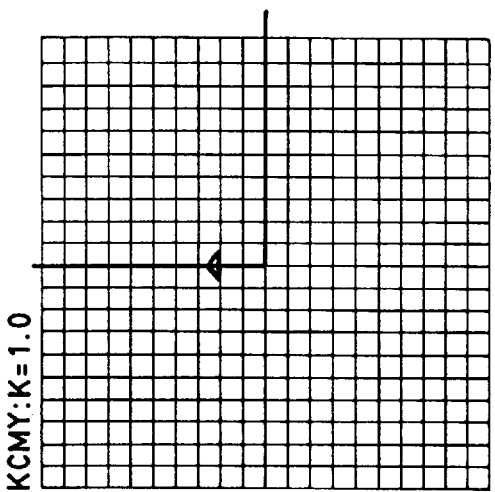
Figure 15G:
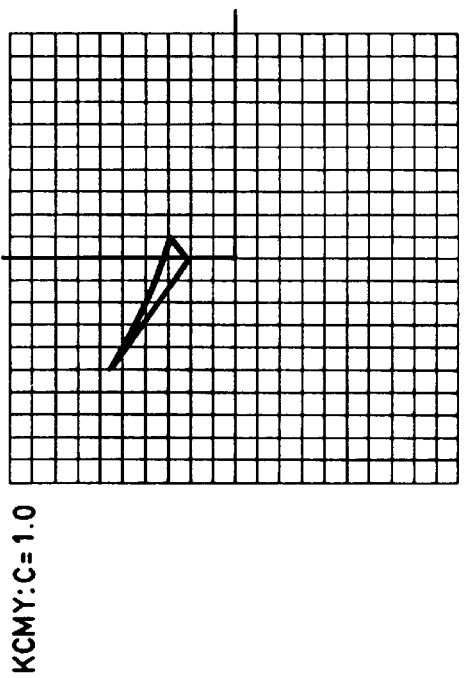
Figure 15F:
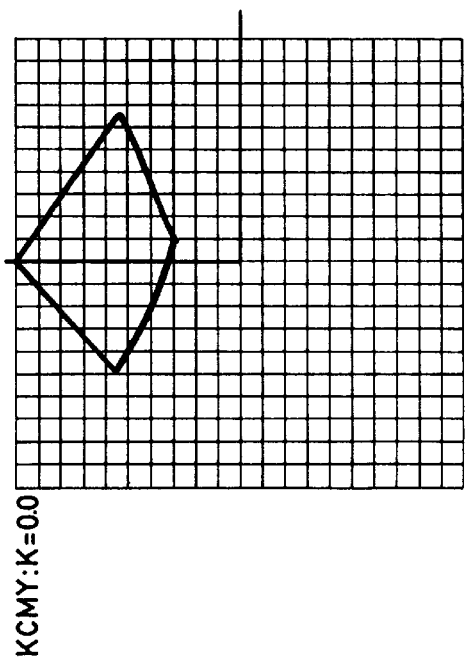
Figure 16A:
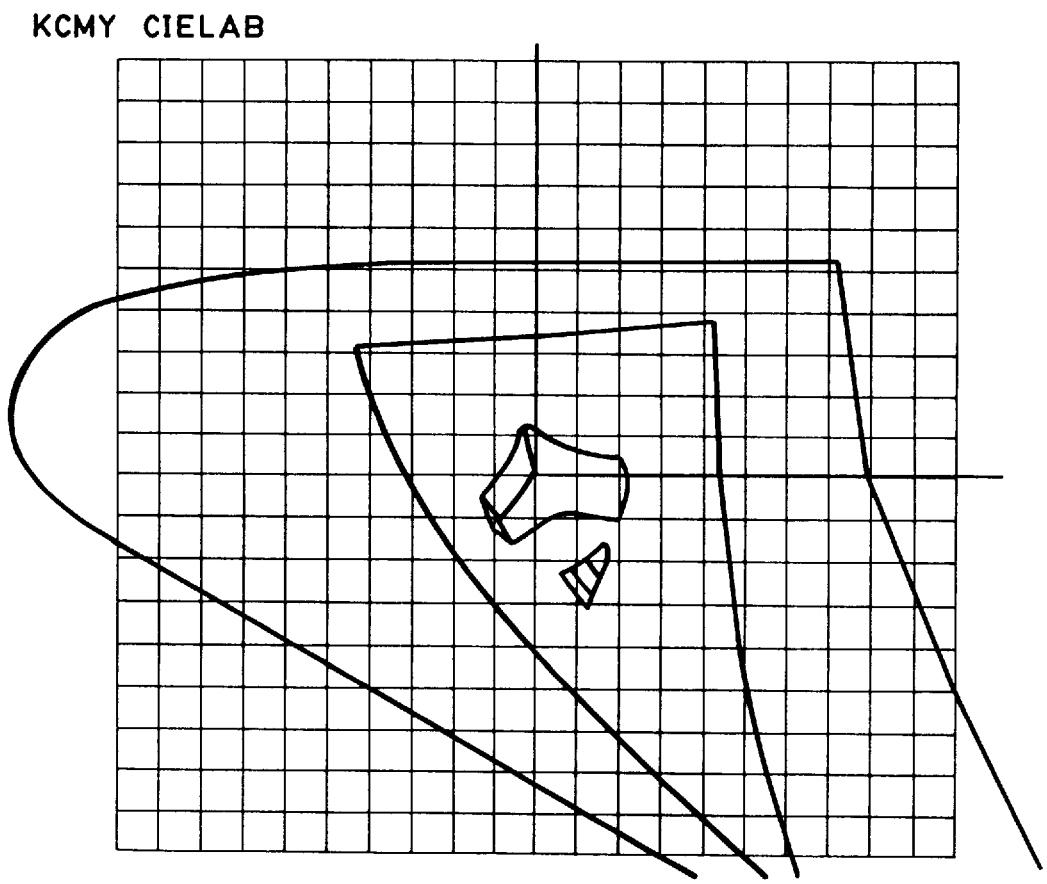
Figure 16B:
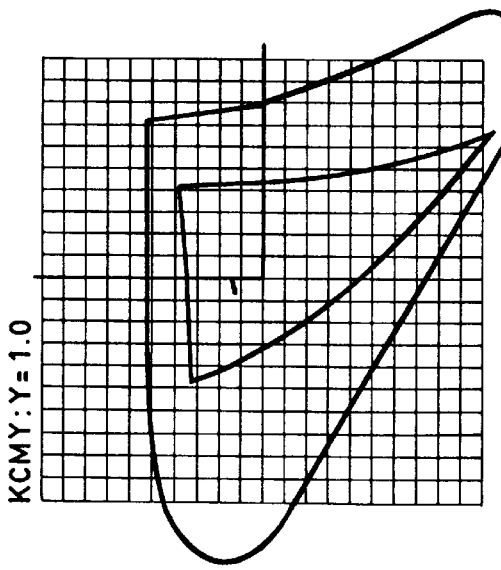
Figure 16C:
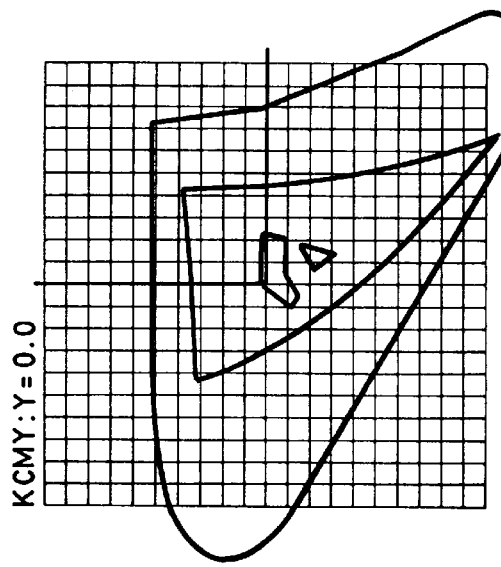
Figure 16:
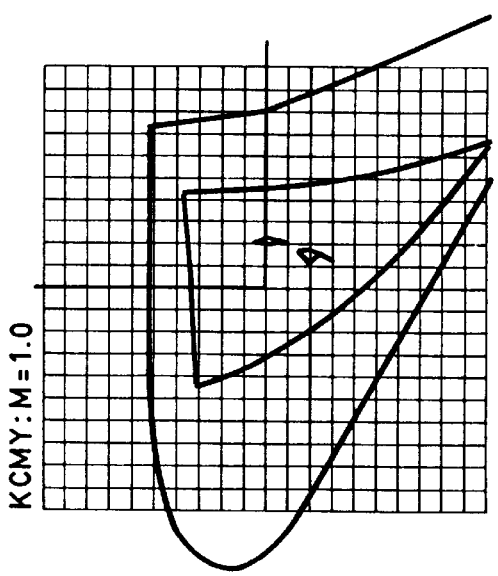
Figure 16E:
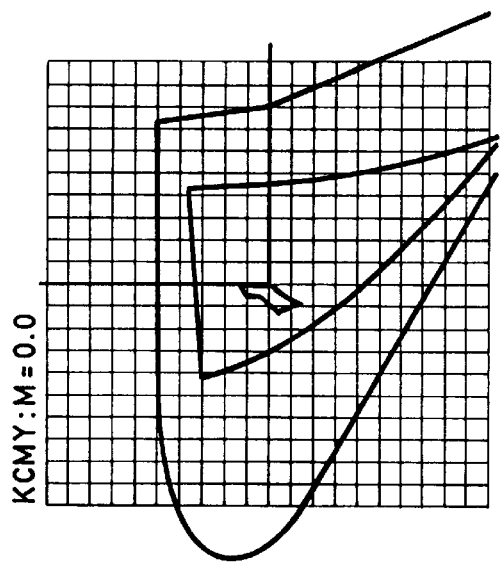
Figure 16G:
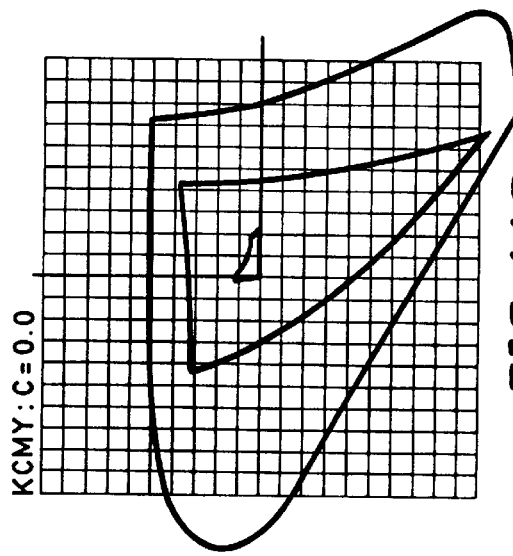
Figure 16H:
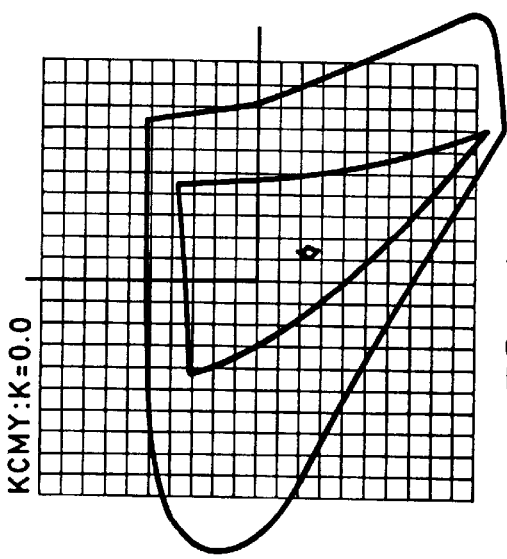
Figure 16F:
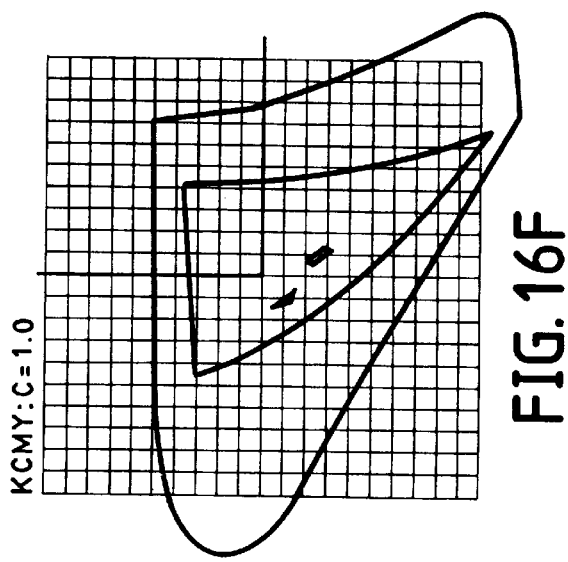
Figure 17A:
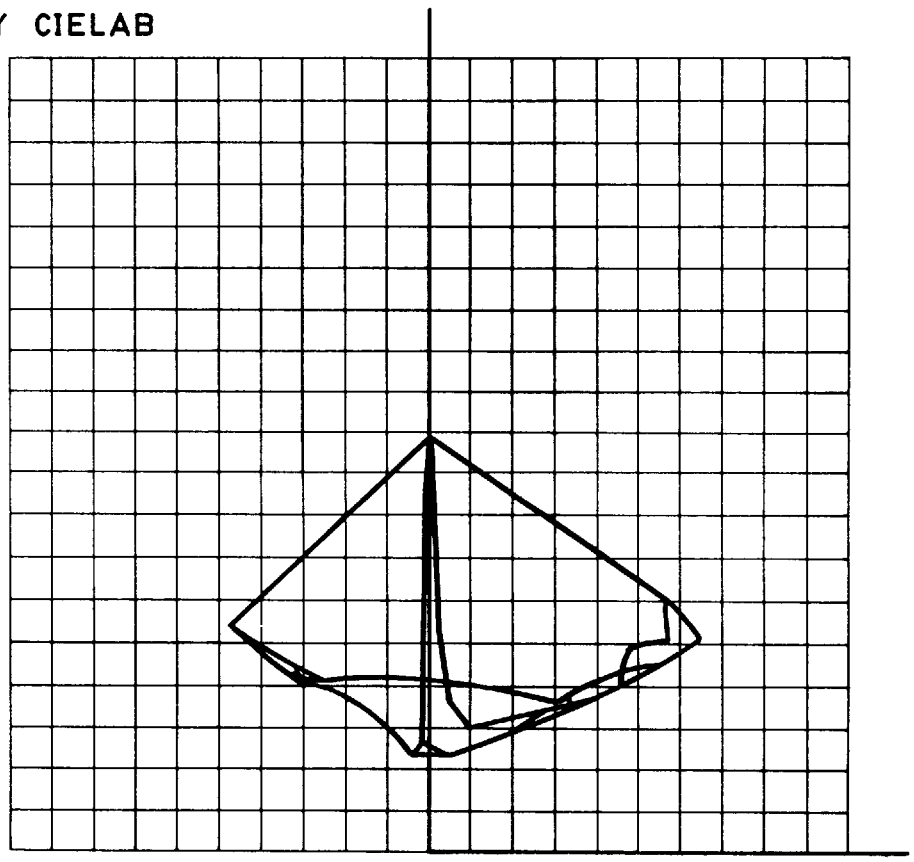
Figure 17C:
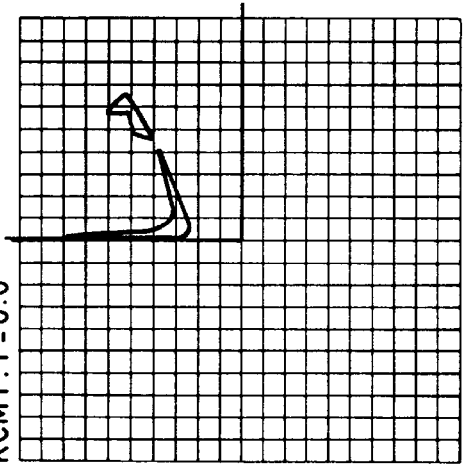
Figure 17E:
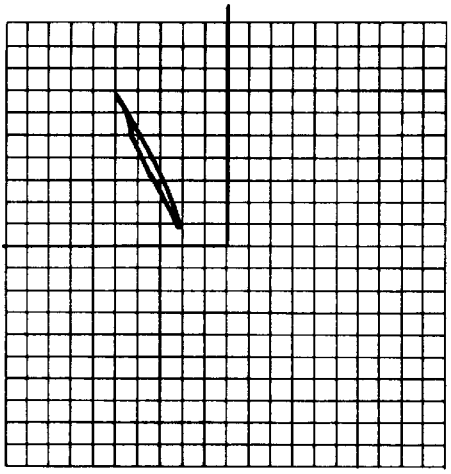
Figure 17B:
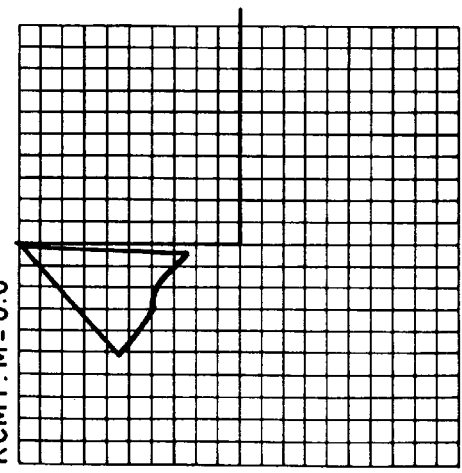
Figure 17D:
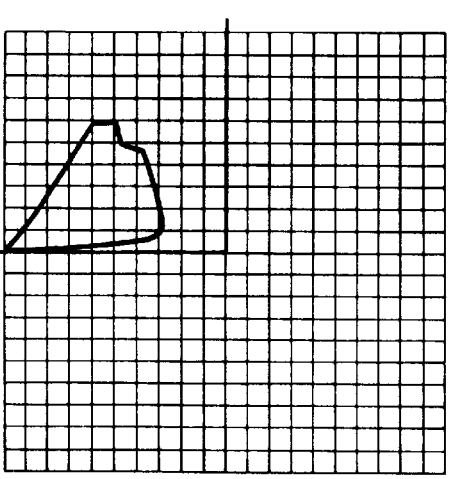
Figure 17G:
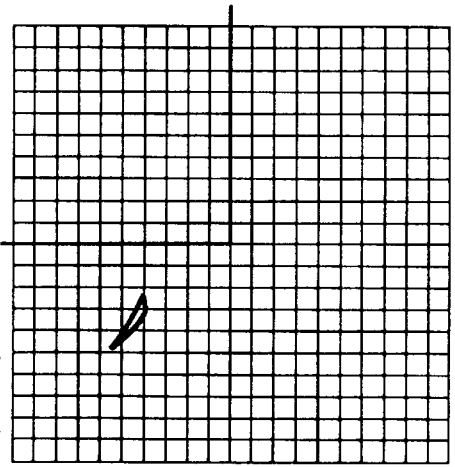
Figure 17H:
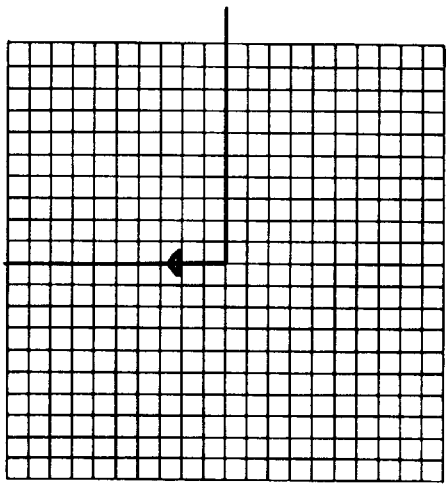
Figure 17F:
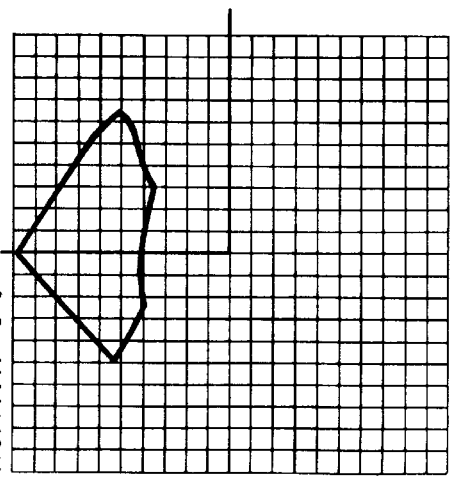

FIG. 15A, 15B, 15C, 15D, 15E, 15F, 15G and 15H In FIG. 15A the cross section of the color gamut with the constant hue plane H*=0 in CIELAB of a cmyk process modeled with the localized Neugebauer equations is represented. The horizontal axis corresponds to the a*-axis, whereas the vertical axis is the lightness axis. The intersection of both axes is black. The distance between the grid lines is 10 CIELAB units. The remaining curves are the cross sections of the physical color boundaries with the constant hue plane H*=0. To calculate these contours, all the boundary 3-ink processes of the cmyk process are determined, and the intersection of their color gamut with the constant hue plane H*=0 is calculated. The union of these cross sections corresponds to the cross section of the color gamut of the cmyk process with the given hue plane. The intersections of the boundary 3-ink processes are represented in FIG. 15B and 15C. The constant colorant and its value is represented at the top of all these figures. The value 0.00 corresponds to 0% and the value 1.00 with 100%.

FIGS. 16A, 16B, 16C, 16D, 16E, 16F, 16G and 16H A similar cross section to FIGS. 11A and 11B is represented with a total colorant limitation of 240%.

FIGS 17A, 17B, 17C, 17D, 17E, 17F, 17G and 17H A similar cross section to FIGS. 12A, 12B, 12C and 12D is represented with a total colorant limitation of 240%.

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

Color Gamut Description

A color gamut is completely determined if its boundaries in color space are known. This means that methods have to be found to describe these boundaries. If we assume that the dimension of the color space is n-dimensional, the dimension of the boundaries is n−1.

If for example colors are specified in tristimulus spaces, or any related transformation of such tristimulus values, the color space is 3-dimensional, and as a result the boundaries will be 2-dimensional and thus they are surfaces. A complete description of the color gamut is obtained if all the boundary surfaces are given. Another way to represent color gamuts is obtained by intersecting the color gamut with a number of surfaces. In this case the color gamut is described with contours.

Color Gamut Boundaries

If the printer is described with continuous functions and colors are represented in a 3-dimensional color space, there will be surfaces in colorant space that map to the 2-dimensional color gamut boundaries in color space. For well-behaved printers, some of the boundary 2-ink processes of the given printer model transform to the color gamut boundaries in color space.

The boundary 2-ink processes with colorants $c_1$ and $c_2$ may transform to color gamut boundaries in color space, because only two independent changes in color space are allowed due to changes of $c_1$ and $c_2$. All the other colorants can only induce limited changes in color space as they can only be changed in one way (increasing or decreasing) in the colorant space without leaving the colorant gamut.

Color Gamut Boundaries by Making Use of the Neugebauer Model

Color Gamut of a 1-ink Process without Colorant Limitations

The Neugebauer equations for a process with one colorant $c_1$ are $$X = k_0 + k_1 c_1$$

$$Y = L_0 + l_1 c_1$$

$$Z = m_0 + m_1 c_1$$

These equations immediately reveal that a 1-ink process transforms onto a straight line in color space.

Color gamut of a 2-ink process without colorant limitations

The Neugebauer equations for a process with two colorants $c_1$ and $c_2$ are:

$$X = k_0 + k_1 c_1 + k_2 c_2 + k_{12} c_1 c_2$$

$$Y = l_0 + l_1 c_1 + l_2 c_2 + l_{12} c_1 c_2$$

$$Z = m_0 + m_1 c_1 + m_2 c_2 + m_{12} c_1 c_2$$

Rearranging these equations leads to:

$$\left( c_1 + \frac{k_2}{k_{12}} \right) \left( c_2 + \frac{k_1}{k_{12}} \right) = \left( \frac{X - k_0}{k_{12}} + \frac{k_1 k_2}{k_{12} k_{12}} \right)$$

$$\left( c_1 + \frac{l_2}{l_{12}} \right) \left( c_2 + \frac{l_1}{l_{12}} \right) = \left( \frac{Y - l_0}{l_{12}} + \frac{l_1 l_2}{l_{12} l_{12}} \right)$$

$$\left( c_1 + \frac{m_2}{m_{12}} \right) \left( c_2 + \frac{m_1}{m_{12}} \right) = \left( \frac{z - m_0}{m_{12}} + \frac{m_1 m_2}{m_{12} m_{12}} \right)$$

These equations reveal that for a given color XYZ, each of the three Neugebauer equations corresponds to a hyperbola in the $c_1 c_2$ colorant plane. The asymptotes are horizontal and vertical lines and the point where both asymptotes intersect is the midpoint of the conic section. FIG. 1 shows an example for the Neugebauer expression of Y.

The transformation of the domain of a 2-ink process to the XYZ space leads to a quadric. This is proven as follows. First the $c_1 c_2$ terms in the first two equations are eliminated by means of the third equation. This yields a first set of two equations from which a second set of equations can be obtained that expresses the $c_1$ and $c_2$ colorants as linear combinations of X, Y and Z. Substituting these two relations again in the last equation results in the formula of a quadric in the XYZ space. If a quadric is intersected with a plane, a conic section is obtained. Hence the hyperbola that represents a constant Y value in the $c_1 c_2$ colorant space is mapped to a conic section in the XYZ space.

Color Gamut of a 3-ink Process without Colorant Limitations

The color gamut of a 3-ink process is contained in the volume defined by the physical color boundaries. As explained earlier, each one of these six surfaces corresponds to the mapping of an boundary for a 2-ink process. These six boundary 2-ink processes have a total of twelve 1-ink processes in common, corresponding to the twelve edges of the cube in colorant space. If the Neugebauer equations are used as a printing model, it is possible to make the following statements regarding the shape of these surfaces and the line segments they have in common:

The twelve line segments that connect the physical color boundaries are straight lines, as they correspond to the mapping of 1-ink processes to color space. This is shown in FIG. 2.

Since the six physical color boundaries correspond to the transformation of boundary 2-ink processes to color space, they have the shape of quadric surfaces. The boundary surfaces in FIG. 2 are not planes but curved surfaces that are parts of quadrics.

Cross sections of the physical color gamut boundary with planes (such as a plane with a constant Y value) results in a conic section.

The actual calculation of a cross section is performed as follows. In the previous paragraph it is shown that the colorants of the physical colorant boundaries resulting in the same Y value lie on hyperbolas. These hyperbolas transform into conic sections in the constant Y plane of the XYZ space. Assuming that an intersection exists, colors with the same Y value form in general one closed contour in both colorant and color space. From the above follows that a description of such a contour can be obtained by analytical evaluation of either the hyperbolas (in colorant space) or conic sections (in color space). It is hence possible to obtain a color gamut description entirely based on the use of analytical methods.

To find the color gamut cross section having, for example, a constant luminance plane of value Y, the following procedure is applied.

From the 3-ink process, its six boundary 2-ink processes are calculated.

For each 2-ink process, its four extracted 1-ink process boundaries are determined.

For every 1-ink process the colorant combination that results in the required Y value is searched for a solution from a linear equation, and the solutions that lie in the colorant gamut of the 1-ink process are retained. There may be 0, 2 or 4 solutions per boundary 2-ink process.

The previous solutions are located into the corresponding boundary 2-ink process, to obtain a number of colorant pairs.

These colorant pairs are ordered according to one colorant from low to high.

Two succeeding colorant pairs starting from the first colorant solution correspond to the end points of a segment of the hyperbola in the boundary 2-ink process that results in colors with the given luminance value.

Per two colorant pairs, the corresponding hyperbola is sampled in colorant space and transformed to color space.

The different contours of all the six boundary 2-ink processes are connected to each other by evaluating their end points. In this way all the contours are obtained that result from intersecting the color gamut with the constant Y plane.

Color Gamut of a 3-ink Process with a Linear Colorant Limitation

A linear colorant limitation for a 3-ink process with colorants $c_1$, $c_2$ and $c_3$ accepts only these colorant combinations for which $a_1 c_1 + a_2 c_2 + a_3 c_3 \leq a_4$ with $a_1$, $a_2$, $a_3$, $a_4$ being real values.

In the following paragraphs a color gamut description will be given for a limitation on the sum of the three colorants of 250%. Nevertheless the method can be easily extended for any linear condition.

The linear colorant limitation related to the previous colorant restriction is given by $c_1 + c_2 + c_3 \leq 250\%$.

Suppose that the color gamut descriptor consists of a set of contours in equiluminance planes. This means that hyperbola in the 6 boundary 2-ink processes have to be determined that result in the given luminance values.

Take for example the boundary 2-ink process $c_1 c_2$ with $c_3 = 0$. The linear condition is reduced to $c_1 + c_2 \leq 250\%$ and hence all the colorant combinations are allowed (see FIG. 3 for the colorant gamut). In this case the four boundary 1-ink processes are determined from the 2-ink process, and for every 1-ink process the colorant values are calculated that result in the given luminance value. In general 0, 2 or 4 colorant values are found that fall within the colorant gamut. For these solutions the corresponding points in the boundary 2-ink process are determined and hence a number of colorant pairs are obtained. If these colorant pairs are ordered from low to high according to one of the colorants, two succeeding colorant pairs describe a part of a hyperbola in colorant space, that transforms to a conic section in the equiluminance plane Y.

For the boundary 2-ink process $c_1 c_2$ with $c_3 = 100\%$ on the other hand, the linear condition becomes $c_1 + c_2 \leq 150\%$ (see FIG. 4 for the colorant gamut). In this case, not only the solutions of the boundary 1-ink processes have to be found that give rise to a color with the given luminance value, but also possible solutions on the line $c_1+c_2=150\%$. Substituting $c_1+c_2=150\%$ in $$Y=l_0+l_1c_1+l_2c_2+l_{12}c_1c_2$$

results in a quadratic equation in one variable. This can give rise to up to two colorant pairs in the boundary 2-ink process. In general, also in this case there may be 0, 2 or 4 solutions in the colorant gamut. If these colorant pairs are ordered from low to high according to one of the colorants, two succeeding colorant pairs will describe a part of a hyperbola in colorant space, that transforms to a conic section in the equiluminance plane Y.

Apart from the six boundary 2-ink processes, an additional colorant boundary has to be analyzed. This is the colorant boundary defined by the plane $c_1+c_2+c_3=250\%$.

Due to this linear relation, there are only two independent colorant values, for example $c_1$ and $c_2$. The allowable colorant combinations for the $c_1c_2$ colorant pairs are delimited by the colorant boundaries $0\% \leq c_1 \leq 100\%$ $0\% \leq c_2 \leq 100\%$ and due to the restrictions on $c_3$ also by $S-100\% \leq c_1+c_2 \leq S$ with S the maximum sum of the colorants. In this case $S=250\%$, and hence only one condition remains i.e. $150\% \leq c_1+c_2$.

In general, there are up to 6 possible line segments that limit the allowable colorant combinations of $c_1c_2$ (see FIG. 5 for the colorant gamut). For each segment one colorant is constant, whereas the other two colorants vary. Hence, colorant combinations on these line segments resulting in colors with the given luminance value can be found as explained in the previous paragraph (solution of a quadratic equation in one colorant variable). In this way a number of colorant pairs are obtained that can be easily positioned in the cross section $c_1+c_2+c_3=250\%$. As a result a number of triplets are found, between which equiluminance curves have to be detected. Also in this case the curves can be obtained by sampling functions. These functions are deduced in the following paragraph.

Due to the linear relation, one colorant in the Neugebauer equations for the 3-ink process can be eliminated, and hence a 2-ink model is obtained that from a mathematical point of view is no longer a Neugebauer model. If the third colorant in the Y-equation of the 3-ink process modeled with the Neugebauer model is eliminated, the following general formula is obtained $$Y=c_2^2(k_0+k_1c_1)+c_2(l_0+l_1c_1+l_2c_1^2)+(m_0+m_1c_1+m_2c_1^2)$$

where $k_0$, $k_1$, $l_0$, $l_1$, $m_0$, $m_1$, $m_2$ are real values.

Similar expressions are obtained for the X and Z tristimulus values and hence they can be interpreted as an additional 2-ink process. The Y-expression can be seen as a quadratic equation in $c_2$ with $c_1$ a parameter. The solutions for $c_2$ are given by $$c_2 = \frac{-B+\sqrt{D}}{2A}$$

with $A=k_0+k_1c_1$ $B=l_0+l_1c_1+l_2c_1^2$ $C=m_0+m_1c_1+m_2c_1^2$ $D=B^2-4AC$

This means that there are two solutions $c_2$ for every value of $c_1$. Both solutions form a curve, one for the +sign and one for the −sign, that lie at equal distances along vertical lines from the curve $c_2=-B/2A$. These solutions will be called the solution-curves, or more specifically the +solution-curve and the −solution-curve. For A=0, one of the solution-curves will go to infinity, while the other will have a finite value. The discriminant D is a fourth degree polynomial in $c_1$. The value of the discriminant D at infinity is always positive and hence for very large positive and negative values of c1 there will always be real solutions for $c_2$. The discriminant D has 0, 2 or 4 real roots. In the case of 0 real roots, there are always two solutions for $c_2$ for every value of $c_1$, resulting in two solution-curves that never cross. An example of this situation is represented in FIG. 6. At the root of A one of the solution-curves will be finite, whereas the other solution-curve goes to infinity, i.e. at one side of the root of A, it goes to +infinity, at the other side to −infinity. In the case of 2 real roots, there will be no real $c_2$ values for $c_1$ values between these roots. For $c_1$ equal to one of the roots of the discriminant D, both solutions will coincide. An example of this situation is represented in FIG. 7. In the case of 4 roots (See FIG. 8), there will be two intervals along the $c_1$-axis for which no real solution for $c_2$ is available.

Because the roots of the discriminant D introduces intervals where no curves can pass, the behavior of the solution-curves can be divided into 5 different classes. In class 1, there is no real root for the discriminant D. In class 2, an interval is represented from +infinity (respectively −infinity) to the largest (respectively smallest) real root of the discriminant D and the root of A falls outside this region. Class 3 is the case in which the root of A falls inside the interval of class 2. In class 4, there are four real roots for the discriminant D. In this case the behavior of the two solution-curves is represented if the root of A falls outside the interval between the second and third largest roots of D. Class 5 is the situation of class 4 with the root of A within the considered interval. Examples of the different classes are represented in FIGS. 9, 10A, 10B, 11A, 11B, 12A, 12B, 12C, 12D, 13A and 13B.

The colorant triplets that were found before will now be classified into pairs that are the end points of equiluminance curves in the plane $c_1+c_2+c_3=250\%$. This is done as follows:

First of all, the points are divided into intervals determined by the roots of the discriminant D because points belonging to different intervals will never lie on the same curve.

Per interval the points that belong to the solution-curve that has a finite value for the root of A are collected in set 1. This solution-curve is found as follows. If for the root of A the polynomial B is positive (respectively negative), the +solution (respectively −solution) curve is taken.

Then per interval the following procedure is applied depending on the class at hand.

Class 1: The remaining triplets with $c_1$ value lower (respectively larger) than the root of A are taken together in set 2 (respectively set 3). For the three sets, the triplets are ordered from low to high according to one colorant.

Class 2: The remaining points are taken together in set 2. For every root of the discriminant D, there is a point in the colorant space where both curves connect. If one of these points falls within the colorant domain of the additional 2-ink process and the interval considered in this class, this point is added to set 1 and set 2. If the interval goes from −infinity (respectively +infinity) one set is ordered from low (respectively high) to high (respectively low). and the other set is ordered in the opposite direction. The first point of the last ordered set is put after the last point of the first ordered set.

Class 3: As in class 1, the remaining points are divided into two sets. For every root of the discriminant D, there is a point in the colorant space where both curves connect. If one of these points fall within the colorant domain of the additional 2-ink process and the interval considered in this class, this point is added to the two sets to which it belongs. This is set 1 and set 2 (respectively set 3) if the interval goes to +infinity (respectively −infinity). Then the points of set 1 are ordered from low (respectively high) to high (respectively low) if the interval goes to −infinity (respectively +infinity) and the set with points larger (respectively smaller) than the root of A are ordered in the other direction. The first point of the last ordered set is put after the last point of set 1. The points in the remaining set are ordered from low to high.

Class 4: The remaining points are taken together in set 2. If the second or third largest root of the discriminant D falls within the colorant domain of the additional 2-ink process, these points are added both to set 1 and set 2. Then per set the points are ordered in opposite directions. Finally, the sets are concatenated. If the endpoint of one set is equal to the start point of the other set, the concatenation is done in such a way that these points are neighbors.

Class 5: The remaining points are divided into two sets as in class 1. For every root of the discriminant D, there is a point in the colorant space where both curves connect. If the second or third largest root of the discriminant D fall within the colorant domain of the additional ink process, these points are added to the two sets to which it belongs. This is set 1 and set 2 (respectively set 3) if the root is smaller (respectively larger) than the root of A. The points of set 2 are ordered from high to low, the points of set 1 are ordered from low to high and finally the points of set 3 are ordered from high to low. Finally the last point of set 1 is put after the last point of set 2 and the first point of set 3 is put after the last point of set 1.

Per class two succeeding points describe a part of the solution-curve to which they belong as found during the classification. Because the solution-curves are analytically available, the segments can be sampled and transformed to color space. By comparing their end points, they can properly be connected to each other until a number of closed contours are found. This is the contour description for the corresponding luminance plane with value Y.

Color Gamut of a 3-ink Process with Several Linear Colorant Limitations

To obtain the color gamut with one linear colorant limitation, six boundary 2-ink processes and one additional 2-ink process for which the linear colorant limitation holds have to be evaluated. The colorant gamuts of the boundary 2-ink processes are limited because the colorant limitation is inherited by these processes. In the case of the additional 2-ink process, the colorant domain is 2-dimensional, limited by up to two linear colorant restrictions imposed by the linear colorant limitation.

If several linear colorant limitations are given, the six boundary 2-ink processes have to be evaluated, but in this case the colorant gamut of the processes is limited by all the colorant limitations. Additionally, for each linear colorant limitation an additional 2-ink process for which the linear colorant limitation holds has to be analyzed. The colorant domain is limited not only by up to two restrictions imposed by the corresponding colorant limitation, but also by the remaining colorant limitations.

In the case of a 3-ink process with the following two linear colorant limitations:

$$c_1+c_2+c_3 \leq S_1$$

$$a_1c_1+a_2c_2+a_3c_3 \leq S_2$$

with $a_1$, $a_2$, $a_3$, $a_4$ real values, the six boundary 2-ink processes are limited by the above noted restrictions. Take for example the $c_1c_2$ process with $c_3=100\%$. The colorant gamut of this boundary 2-ink process is limited by $$c_1+c_2 \leq S_1-100$$

$$a_1c_1+a_2c_2 \leq S_2-100a_3$$

Apart from these six boundary 2-ink processes there are two additional 2-ink processes (one per colorant limitation). This is a process in which only two colorants, suppose $c_1$ and $c_2$, can vary independently because The process only deals with colorant combinations for which the corresponding colorant limitation holds. The colorant domain of this process is limited by up to two colorant limitations, deduced from the corresponding colorant limitation.

In the case of the first colorant limitation. The two colorant restrictions are given by $$S_1-100 \leq c_1+c_2 \leq S_1$$

Apart from these restrictions, also the second linear colorant limitation has to be considered, i.e.

$$a_1c_1+a_2c_2+a_3c_3 \leq S_2$$

Taking into account that for this process only colorant combinations are evaluated for which $$c_1+c_2+c_3 = S_1,$$

the previous equation is reduced to $$c_1(a_1-a_3)+c_2(a_2-a_3) \leq S_2-a_3S_1.$$

Hence, the colorant domain of the additional 2-ink process is limited by the following colorant limitations $$c_1(a_1-a_3)+c_2(a_2-a_3) \leq S_2-a_3S_1$$

$$S_1-100 \leq c1+c2 \leq S_1.$$

The boundaries of the colorant domain of the six boundary 2-ink processes and the two additional 2-ink process are represented by a polygon. The methods presented in the previous section can be used to find colorant combinations on the line segments of these polygons that result in the given luminance value, to classify these colorant combinations and finally to determine the equiluminance curves between the previously classified colorant combinations.

Color Gamut of an N-ink Process without Colorant Limitations

The color gamut of an n-ink process with n>3 can be found by taking the union of the color gamuts of all the boundary 3-ink processes from the n-ink process.

Color Gamut of an N-ink Process with Linear Colorant Limitations

In the case of a 4-ink process, a general linear colorant limitation with colorants $c_1, c_2, c_3, c_4$ is given by $$a_1c_1 + a_2c_2 + a_3c_3 + a_4c_4 \leq a_0$$

where $a_0, a_1, a_2, a_3, a_4$ real values.

The color gamut corresponds to the union of the color gamuts of the boundary 3-ink processes. These processes inherit the colorant limitation of the 4-ink process by substituting the value of the remaining colorant in the colorant limitation. For the $c_1$ $c_2$ $c_3$ -ink process with $c_4=100\%$ for example, the colorant limitation reduces to $$a_1c_1 + a_2c_2 + a_3c_3 \leq a_0 - 100a_4$$

Apart from all these 3-ink processes, also the process with $a_1c_1 + a_2c_2 + a_3c_3 + a_4c_4 = a_0$ should be taken into account. The possible colorant combinations can be presented in the 3-dimensional colorant space $c_1$ $c_2$ $c_3$ with colorant limitations $$a_1c_1 + a_2c_2 + a_3c_3 \geq a_0 - 100a_4$$

and $$a_1c_1 + a_2c_2 + a_3c_3 \leq a_0$$

Because in this invention only well-behaved ink processes are considered, a colorant combination inside this colorant gamut cannot lie on the boundary of the color gamut. As a result, only the boundaries of this colorant gamut have to be transformed. These boundaries however correspond to colorant combinations with two of the four colorants set at their minimum or maximum value and hence they are already taken into account in the boundary 3-ink processes.

This result can be easily extended for n inks with any number of linear colorant limitations. Hence, the color gamut of an n-ink process is the union of the color gamuts of the boundary 3-ink processes.

Color Gamut with Limitation on the Number of Simultaneously Printed Colorants

In most practical situations, the number of simultaneously printed colorants is limited. A typical example is hifi-color printing with 7 inks. It is almost impossible to construct a model for 7 inks because too many colorant combinations have to be printed and measured. Therefore the printer model of an n-ink process consists of a number of submodels, that each represent the printer for a limited number of colorants. In the case of hifi-color printing, the process could be modeled with a number of 4-ink processes, and as a result the color gamut is the union of the color gamuts of these 4-ink processes.

In general, if an n-ink process is modeled with a number of m-ink processes with m<n, the color gamut is the union of the color gamut of the m-ink processes. If there are colorant limitations for the n-ink process, they are inherited by the m-ink processes.

If however, a model is available for the n-ink process, and only m inks may be printed simultaneously, only boundary m-ink processes of the n-ink model are taken for which the remaining n-m inks are equal to 0%. The color gamut of the n-ink process is the union of the color gamuts of these boundary m-ink processes.

Color Gamut Boundaries by Making Use of Localized Neugebauer Equations

Color Gamut of an N-ink Process

To model the printing process accurately, the localized Neugebauer equations (LNE) should be used. The color gamut description based on LNE is obtained by determining the color gamut of all the Neugebauer cells. These cells are Neugebauer processes with limitations per colorant. The union of all these color gamuts provides the color gamut of the n-ink process.

For a well-behaved 3-ink process however, faster results are obtained by determining the boundary 2-ink processes, that are localized Neugebauer equations for two colorants. The color gamut of the 3-ink process is found by taking the envelope of all the previous boundary 2-ink processes.

For a well-behaved n-ink process with n>3, the previous procedure is generalized as follows:

the boundary 3-ink processes are determined from the n-ink process;

per boundary 3-ink process the color gamut is determined as explained in the previous paragraph for a well-behaved 3-ink process; and the color gamut of the n-ink process is the union of the color gamuts of the previously boundary 3-ink processes.

Color Gamut of an N-ink Process With Linear Colorant Limitations

If the color gamut is determined by taking the union of the color gamuts of all the localized Neugebauer equations, the colorant limitations are inherited by each localized Neugebauer process.

For well-behaved 3-ink processes, a faster method can be used. Therefore the following two classes of Neugebauer cells are taken into account 1. Cells that contain at least one 2-ink process for which the third ink is equal to its minimum or maximum value according the colorant gamut of the 3-ink process and that are not cut or rejected by the linear colorant limitations 2. Cells that are cut by the linear colorant limitations. From the first class of cells, the extracted 2-ink processes are taken for which the third ink is equal to its minimum or maximum value according to the colorant gamut of the 3-ink process.

From the second class, two different kinds of processes are extracted. First of all, the extracted 2-ink processes are taken for which the third ink is equal to its minimum or maximum value according to the colorant gamut of the 3-ink process, taking into account the linear colorant limitations that are inherited by these processes. Secondly, the additional 2-ink processes of these Neugebauer cells are retained, taking into account the linear colorant limitations that are inherited by these processes.

For all these processes, the equiluminance curves are determined and are transformed to color space. In color space these curves are linked together by comparing their end points. As a result a number of closed contours are obtained in an equiluminance plane.

For a well-behaved n-ink process, the boundary 3-ink processes are determined and the union of the color gamuts of these extracted localized Neugebauer processes for three inks corresponds to the color gamut of the n-ink process.

Figure 14C:
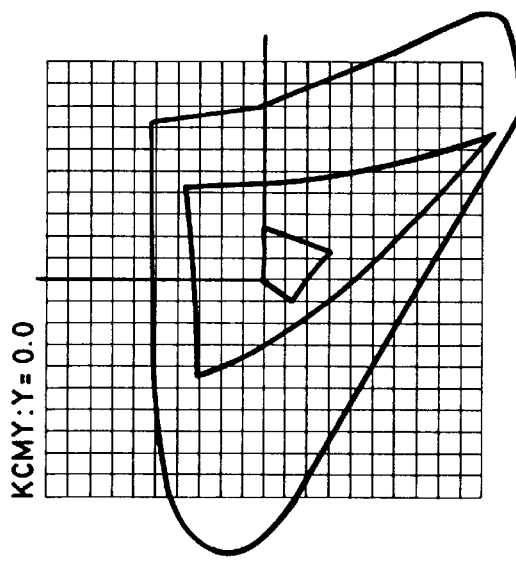
Figure 14E:
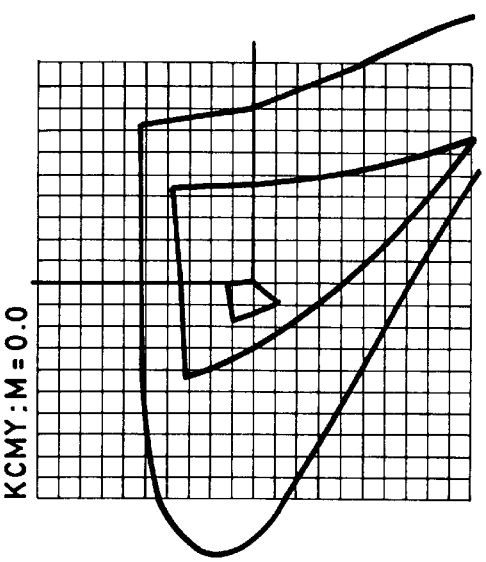
Figure 14B:
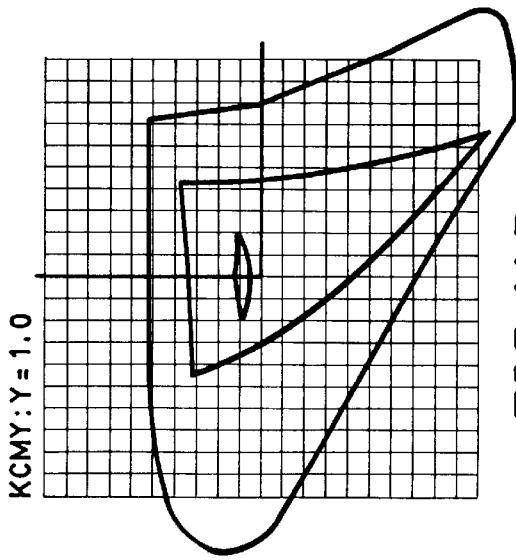
Figure 14D:
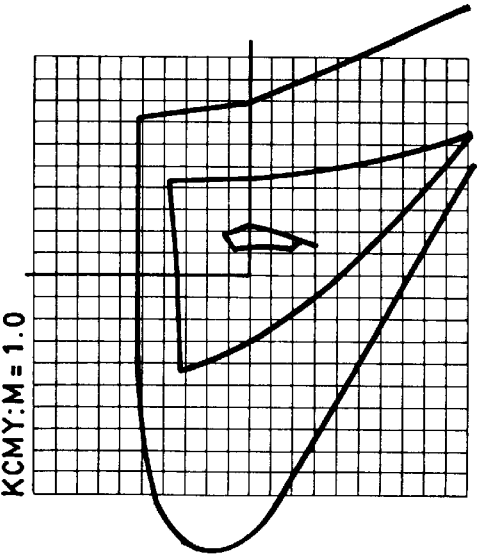
Figure 14F:
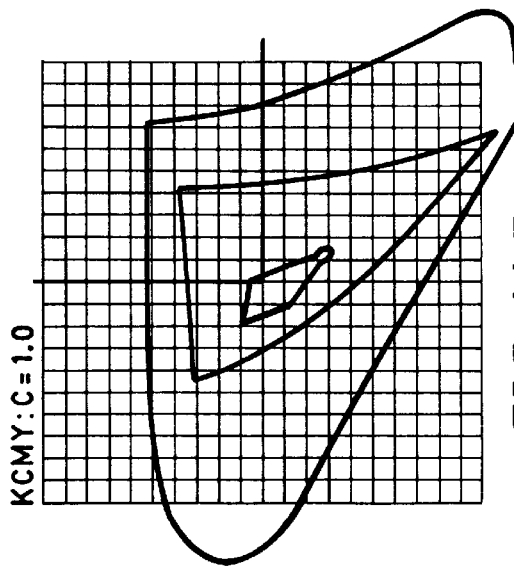
Figure 14G:
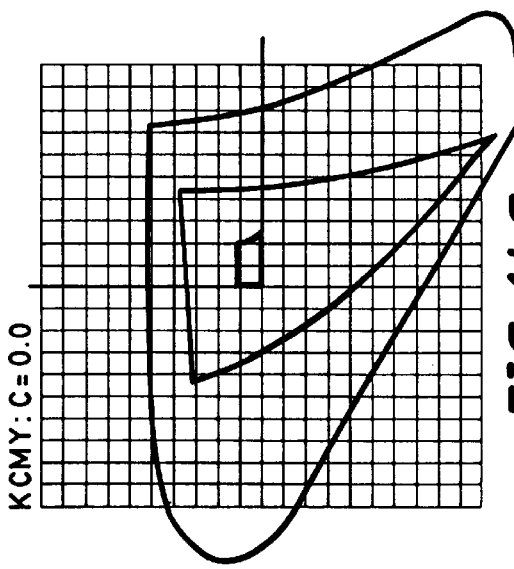
Figure 14H:
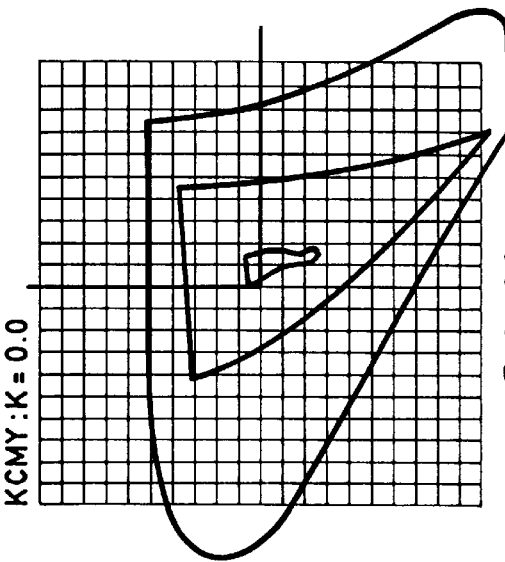

Cross sections of the color gamut in CIELAB of a cmyk process modeled with the localized Neugebauer equations are represented in FIGS. 14A–H, 15A–H, 16A–H and 17A–H. In the FIGS. 14A–H and 15A–H no colorant limitations are given, whereas in FIGS. 16A–H and 17A–H there is a total ink restriction of 240%. FIGS. 14A–H and 16A–H are cross sections in constant lightness planes. The horizontal (respectively vertical) axis corresponds to the a* (respectively b*) axis. The intersection of both axes is the achromatic color. The distance between the grid lines is 10 CIELAB units. The outer curve represents the MacAdam limits, the thinner inner curve represents the color gamut of a color CRT display. The remaining curves are the cross sections of the physical color boundaries with the lightness plane $L^*=30$. To calculate these contours, all the extracted boundary 3-ink processes of the cmyk process are determined, and the intersection of their color gamut with the lightness plane $L^*=30$ is calculated. The union of these cross sections, represented in FIGS 14A, 15A, 16A and 17A, corresponds to the cross section of the color gamut of the cmyk process with the given lightness plane. The intersections of the boundary 3-ink processes are represented in FIGS. 14A and 14C (respectively FIGS. 16B and 16C). The constant colorant and its value is represented at the top of all these figures. The value 0.00 corresponds to 0% and the value 1.00 with 100%. In the FIGS. 15A–H and 17A–H the cross sections with the constant hue plane $H^*=0$ in CIELAB are given. The horizontal axes corresponds to the $a^*$-axis, whereas the vertical axis is the lightness axis. The intersection of both axis correspond to the color black. Also in these figures the distance between the grid lines is 10 CIELAB units. The cross sections of the boundary 3-ink processes with the given constant hue plane are given in FIGS. 15B and 15C (respectively 17B and 17C). Also in these figures, the constant colorant and its value is represented at the top.

Color Gamut of an N-ink Process with Colorant Limitations

To determine the color gamut of an n-ink process, the boundary 3-ink processes are calculated. The union of the color gamuts of the boundary 3-ink processes result in the color gamut of the n-ink process.

The problem that has to be resolved now is the calculation of the color gamut with non-linear colorant limitations of a 3-ink process. In general it is not possible to solve this problem analytically as in the case of linear colorant limitations. Therefore the volume of the allowable colorant combinations in colorant space is approximated with surfaces that can be treated analytically. For example, in the case of localized Neugebauer equations, the boundary of the allowable colorant combinations can be approximated with planes.

One possibility is to use a rather fine grid in colorant space for the localized Neugebauer equations. Each cell can be seen as a voxel, with which the allowable colorant combinations are approximated. For each voxel/Neugebauer cell that falls mainly within the allowable colorant combinations, the color gamut is determined and the color gamut of the 3-ink process is the union of the color gamuts of these voxels. In this case the colorant gamut is approximated with planes that are 2-ink boundary processes of Neugebauer cells. Another solution is to use a more sparse grid for the LNE, and approximating the colorant gamut with planes in a number of Neugebauer cells. In this case some cells fall completely outside the colorant gamut, some fall completely inside the colorant gamut and for the remaining cells only a part delimited by a linear colorant limitation belongs to the colorant gamut. The union of the color gamuts of these last two types of Neugebauer cells, results in the color gamut of the 3-ink process.

Color Gamut With Limitation on the Number of Simultaneously Printed Colorants

The gamut of an n-ink process modeled with the localized Neugebauer equations with a limitation on the number of simultaneously printed colorants is treated in the same way as the Neugebauer equations with similar limitations.

If the n-ink process is modeled with a number of LNE for m colorants, the color gamut is the union of the color gamuts of the m-ink processes. Colorant limitations are inherited by the m-ink processes in the usual way.

If a LNE for n colorants is available, but only m-inks may be printed simultaneously, the extracted m-ink processes of the n-ink model are determined for which the remaining n-m inks are set to 0%. The union of the color gamuts of these m-ink processes gives the color gamut of the n-ink process.

Color Gamut Boundaries by Making Use of a General Printer Model

Color Gamut of a 3-ink Process

For most models it is not possible to give an analytic description of the color gamut boundaries. Nevertheless the previous method to calculate the color gamut can still be applied for these models, i.e. to transform the physical colorant boundaries to color space. In this case the color gamut can be characterized with a set of contours.

If the color model relates XYZ in function of the printer variables, all the boundary 2-ink processes are determined of the 3-ink process. If cross sections with constant Y-values are searched for, a contour follower can be used to determine all the colorant combinations that result in the same Y-value.

One possible method exists in making a digital gray value image of the 2-ink process. The two colorants are the coordinates, and the gray value corresponds to the Y-value for the particular colorant combination. If for example the colorants are sampled per percentage, a 101X101 gray value image will be obtained. To determine the colorant combinations that result in a given Y-value, the image is thresholded at that value and all the resulting contours are searched for with a contour follower. In this way several contours can be found that needed to be closed. If this process is repeated for every boundary 2-ink process, the contours can be connected to each other, and hence a set of closed contours will be found. The transformation of these contours to color space results in the color gamut description for the 3-ink process.

Color Gamut of a 3-ink Process With Linear Colorant Limitations

Suppose that only one colorant limitation is given. In the same way as for the gamut calculation of a 3-ink process with a linear colorant limitation, the six boundary 2-ink processes, and an additional 2-ink process have to be evaluated.

The linear colorant restriction is inherited by the boundary 2-ink processes. As in the previous paragraph, a contour follower is used to find the colorant combinations that result in the colors with the same Y-value. Also in this case a digital gray value image could be created. The contour follower is then applied in such a way that no boundary conditions are violated.

Also for the additional 2-ink process, a gray value image could be created of which the rows and columns correspond to the two independent colorant values. The image values correspond to the Y values, and hence again a contour follower can be used to determine the colorant combinations that result in colors with the same Y-value.

All the contours are linked until a number of closed contours are found and transformed to color space.

If several colorant limitations are given, the previous method can be easily extended.

Color Gamut of an N-ink Process

In the same way as for the Neugebauer equations, all the boundary 3-ink processes are determined of the printer model. The gamut of the n-ink process is the union of the gamuts of the boundary 3-ink processes. Also the limitation on the number of simultaneously printed colors are dealt with in the same way as for the Neugebauer equations.

Approximation With Localized Neugebauer Equations

Any printer model can be approximated by making use of the localized Neugebauer equations with any accuracy if a sufficient number of Neugebauer cells are used. Therefore it is possible to determine the color gamut of every printer model by approximating this model with the localized Neugebauer equations and calculating the color gamut of these equations.

Having described in detail preferred embodiments of the current invention, it will now be apparent to those skilled in the art that numerous modifications can be made therein without departing from the scope of the invention as defined in the following claims.

I claim:

1. Method for obtaining a description of a color gamut for a color reproduction device, describing said color gamut by a plurality of closed contours, each of said plurality of closed contours situated on a surface in a color space, the method comprising the following steps:

characterizing said color reproduction device by a printer model for transforming colorant values in a colorant space to color values in the color space;

determining a plurality of curves in said colorant space, each of said plurality of curves being based upon:
said printer model;
the surface in the color space; and
at least one colorant boundary or at least one colorant limitation in said colorant space, and transforming said plurality of curves to a plurality of contour segments in the color space, according to said printer model.

2. Method according to claim 1, wherein each of said plurality of curves is determined by evaluation of a function in said colorant space.

3. Method according to claim 1, further comprising the steps of:

establishing a plurality of 2-colorant samples in said colorant space;

computing from each said 2-colorant sample at least one of said colorant values according to said printer model; and finding said plurality of curves in said colorant space by following contour lines of said plurality of closed contours having at least one of said colorant values.

4. Method according to claim 1, wherein transforming each of said plurality of curves comprises the steps of:

sampling each of said plurality of curves to obtain a plurality of samples in said colorant space;

transforming each of said plurality of samples to the color space, according to said printer model.

5. Method according to claim 1, wherein said printer model is restricted to three variable said colorant values while determining said plurality of curves.

6. Method according to claim 1, wherein said printer model is based on Neugebauer equations.

7. Method according to claim 1, wherein said at least one colorant limitation is defined by an equation having two variable said colorant values, said equation establishing at least one curve endpoint of said plurality of curves.

8. The method of claim 1, further comprising the step of concatenating at least two ones of said plurality of curves having adjacent endpoints in said colorant space.

9. The method of claim 1, further comprising the step of concatenating said plurality of contour segments to form said plurality of closed contours.

10. Method according to claim 1, wherein said colorant values are limited to a colorant gamut and the step of determining said plurality of curves in said colorant space comprises:

determining at least one 2-ink process from said printer model;

determining at least one 1-ink process from each determined 2-ink process;

in each determined 1-ink process, determining at least one subset of colorant values within said colorant space; and constructing said plurality of curves in said colorant space having two of said subsets of colorant values, belonging to said at least one 2-ink process, and having curve endpoints.

11. Method according to claim 10, wherein said plurality of contour segments are connected at contour endpoints, being said curve endpoints transformed to the color space according to said printer model.

12. Method for obtaining a description of a color gamut for a color reproduction device, describing said color gamut by a plurality of closed contours, each of said plurality of closed contours situated on a surface in a color space, the method comprising the following steps:

characterizing said color reproduction device by a printer model for transforming colorant values in a colorant space to color vales in the color space;

determining said plurality of closed contours having designated contour endpoints in the color space, each of said plurality of closed contours being based upon:
said printer model;
the surface in color space; and
at least one colorant boundary in said colorant space; and concatenating at least two of said plurality of closed contours having adjacent said contour endpoints in the color space.

13. Method according to claim 12, wherein the color values are limited to the color gamut and the step of determining a plurality of closed contours comprises:

determining at least one 2-ink process from said printer model;

determining at least one 1-ink process from each determined 2-ink process;

in each determined 1-ink process, determining at least one subset of colorant values within said colorant space and corresponding, via said printer model, to said color values on one intersecting surface;

constructing each of said plurality of closed contours having two of said subsets of color values, obtained from transforming two of said subsets of colorant values belonging to said at least one 2-ink process, and having contour endpoints.

14. Method according to claim 12, wherein contour segments are connected at said contour endpoints.

15. Method according to claim 12, wherein said printer model is restricted to three variable said colorant values while determining said plurality of closed contours.

16. Method according to claim 12, wherein said printer model is based on Neugebauer equations.

17. Method according to claim 12, wherein each of said plurality of closed contours is determined in the color space by evaluation of an analytical function.

18. Method according to claim 17, wherein the step of determining each of said plurality of closed contours by evaluating an analytical function is accomplished for said 2-ink process by:

generating said analytical function by eliminating two remaining variable colorant values from said printer model; and determining said plurality of closed contours by sampling said analytical function in the color space between said contour endpoints.

19. Method for obtaining a description of a color gamut for a color reproduction device, describing said color gamut by a plurality of surfaces containing closed contour segments, the method comprising the following steps:
characterizing said color reproduction device by a printer model for transforming colorant values in a colorant space to color values in a color space;
determining the plurality of surfaces in said color space based upon:
said printer model; and
at least one colorant boundary in said colorant space; and
concatenating at least two of the plurality of surfaces having adjacent said closed contour segments in said color space.

20. Method according to claim 19, wherein said plurality of surfaces are connected at said closed contour segments.

21. Method according to claim 19, wherein said printer model is restricted to three variable said colorant values.

22. Method according to claim 19, wherein said printer model is based on Neugebauer equations.

23. Method according to claim 19, wherein each of said plurality of surfaces is determined in the color space by an analytical function, bounded by said closed contour segments.

24. Method according to claim 23, wherein said analytical function is obtained by:
determining at least one 2-ink process from said printer model; and
eliminating two remaining variable said colorant values from said printer model.

25. Method according to claim 23, wherein said contour segments are determined by:
determining at least one 1-ink process from each 2-ink process; and
transforming said colorant values of each determined 1-ink process to said color space.

* * * * *